United States Patent
de la Rosa Tames et al.

(10) Patent No.: US 8,483,880 B2
(45) Date of Patent: Jul. 9, 2013

(54) ROBOTIC HAND

(75) Inventors: Armando de la Rosa Tames, London (GB); Graeme Richard Lawrence Walker, London (GB); Jake Benjamin Goldsmith, Suffolk (GB); John Hugo Elias, London (GB); Matthew Paul Godden, Befordshire (GB); Richard Martin Greenhill, London (GB)

(73) Assignee: The Shadow Robot Company Limited, London (GB)

( * ) Notice: Subject to any disclaimer, the term of this patent is extended or adjusted under 35 U.S.C. 154(b) by 378 days.

(21) Appl. No.: 12/841,990

(22) Filed: Jul. 22, 2010

(65) Prior Publication Data

US 2011/0040408 A1 Feb. 17, 2011

Related U.S. Application Data

(60) Provisional application No. 61/227,738, filed on Jul. 22, 2009.

(51) Int. Cl.
*G05B 15/00* (2006.01)

(52) U.S. Cl.
USPC ........... 700/258; 700/245; 700/248; 700/257; 700/260; 700/262; 901/7; 901/21; 901/28; 901/29; 901/30; 602/5; 602/20; 602/22; 600/595; 606/130

(58) Field of Classification Search
USPC ................. 700/245, 248, 257, 258, 260, 262, 700/263; 901/7, 21, 28, 29, 30, 34, 36, 39; 294/106, 907, 111; 602/5, 20, 22; 74/490.05, 74/490.06; 482/4, 6, 47; 345/163, 165; 600/595; 623/24, 64; 606/130; 414/4, 7; 601/40; 128/898
See application file for complete search history.

(56) References Cited

U.S. PATENT DOCUMENTS

| | | | |
|---|---|---|---|
| 1,298,502 A | 3/1919 | Henning | |
| 2,847,678 A | 8/1958 | Opuszenski | |
| 3,694,021 A | 9/1972 | Mullen | |
| 4,246,661 A | 1/1981 | Pinson | |
| 4,351,553 A | 9/1982 | Rovetta et al. | |
| 4,865,376 A * | 9/1989 | Leaver et al. | 294/111 |
| 4,921,293 A | 5/1990 | Ruoff et al. | |
| 4,955,918 A | 9/1990 | Lee | |
| 4,980,626 A | 12/1990 | Hess et al. | |
| 5,062,673 A | 11/1991 | Mimura | |
| 5,080,682 A | 1/1992 | Schectman | |
| 5,280,981 A * | 1/1994 | Schulz | 294/106 |
| 5,447,403 A | 9/1995 | Engler, Jr. | |
| 5,647,723 A | 7/1997 | Rush | |
| 6,042,555 A * | 3/2000 | Kramer et al. | 600/595 |
| 6,244,644 B1 | 6/2001 | Lovchik et al. | |
| 6,413,229 B1 * | 7/2002 | Kramer et al. | 600/595 |
| 6,435,794 B1 * | 8/2002 | Springer | 414/5 |
| 6,517,132 B2 | 2/2003 | Matsuda et al. | |

(Continued)

*Primary Examiner* — McDieunel Marc
(74) *Attorney, Agent, or Firm* — McDermott Will & Emery LLP

(57) ABSTRACT

A robotic hand assembly comprising: a hand section comprising: at least one digit provided with at least one actuatable joint; and a control section comprising: at least one actuation device, the at least one actuation device comprising: a sensing module configured to sense a force applied to a tendon coupled at a first end to the at least one actuatable joint; and an actuation module configured to actuate the at least one actuatable joint.

18 Claims, 19 Drawing Sheets

U.S. PATENT DOCUMENTS

| | | |
|---|---|---|
| 7,168,748 B2 | 1/2007 | Townsend et al. |
| 7,370,896 B2 * | 5/2008 | Anderson et al. .............. 294/106 |
| 7,673,916 B2 * | 3/2010 | Greenhill et al. .............. 294/106 |
| 8,021,435 B2 * | 9/2011 | Bravo Castillo ................ 623/64 |
| 8,231,158 B2 * | 7/2012 | Dollar et al. ................... 294/106 |
| 2006/0271192 A1 * | 11/2006 | Olsen et al. ................. 623/13.14 |
| 2008/0066574 A1 * | 3/2008 | Murata et al. .................... 74/826 |
| 2010/0313679 A1 * | 12/2010 | Larkin et al. ............. 73/862.045 |

* cited by examiner

ROBOTIC HAND

This application claims the benefit of U.S. Provisional Application No. 61/227,738, filed on Jul. 22, 2009, which is hereby incorporated by reference herein.

TECHNICAL FIELD

The invention relates to a robotic hand. In particular, the invention relates to a motorised robotic hand. In one embodiment, the robotic hand has improved force sensing. In another embodiment, the robotic hand has improved control of digit movement.

BACKGROUND

It is desirable to use robotic devices in many industries. U.S. Pat. No. 7,168,748 B2 entitled "Intelligent, Self-Contained Robotic Hand" discloses a known robotic hand comprising three fingers. However, it is desirable for a robotic hand to imitate a human hands gripping functionality and range of movement.

The human hand is capable of numerous, and a wide range of, movements. In addition, the human hand is capable of gripping objects of numerous different sizes using a wide range of forces from very delicate to very strong. The vast range of movements and functionality are difficult to mimic, since each additional range of movement requires the use of a further joint in the robotic hand. Each joint of a robotic hand requires a power supply and control means, both of which require connection to the joint. This results in a highly complex arrangements of wires, which multiplies for every additional joint. The large numbers of wires results in robotic hands being complex to produce and bulky, which in turn reduces the dexterity of the robotic hand.

The present invention aims to provide a robotic hand which more closely mimics a human hand. In addition, the present invention aims to provide a robotic hand which has more accurate control and which is less bulky than known robotic hands.

SUMMARY

According to one embodiment of the invention a robotic hand assembly is provided. The robotic hand assembly comprising: a hand section comprising: at least one digit provided with at least one actuatable joint; and a control section comprising: at least one actuation device, the at least one actuation device comprising: a sensing module configured to sense a force applied to a tendon coupled at a first end to the at least one actuatable joint; and an actuation module configured to actuate the at least one actuatable joint.

According to another embodiment of the invention the tendon comprise a first tendon and a second tendon.

According to another embodiment of the invention the sensing module comprises: a first force sensor; a second force sensor; and a connection bar coupled between the first and second force sensors.

According to another embodiment of the invention the first force sensor is configured to sense a force applied to the first tendon and the second force sensor is configured to sense a force applied to the second tendon.

According to another embodiment of the invention the first tendon is routed over the connection bar adjacent to the first force sensor, and the second tendon is routed over the connection bar adjacent to the second force sensor.

According to another embodiment of the invention the sensing module further comprises: a spool, wherein a second end of the tendon is coupled to the spool.

According to another embodiment of the invention the spool comprises a first spool and a second spool, and wherein the second end of the first tendon is coupled to the first spool and the second end of the second tendon is coupled to the second spool.

According to another embodiment of the invention the first spool and the second spool are configured to be moveable relative to one another, in order to adjust a tension in the first and second tendons.

According to another embodiment of the invention the sensing module further comprises: a securing device configured to secure the first and second spools relative to one another.

According to another embodiment of the invention the at least one actuation device further comprises: a tensioner module configured to apply tension the tendon.

According to another embodiment of the invention the tensioner module comprises: biasing means configured to bias the tendon in a first direction to apply tension to the tendon.

According to another embodiment of the invention the biasing means comprises: a pulley provided in a recess, wherein the tendon is routed around the pulley; and a biasing device coupled to the pulley biasing the pulley towards a first end of the recess to apply tension the tendon.

According to another embodiment of the invention the biasing device comprises a spring.

According to another embodiment of the invention the actuation module comprises a motor and gears.

According to another embodiment of the invention the actuation module further comprises control means for controlling the motor and gears.

According to another embodiment of the invention the control means comprises a printed circuit board.

According to another embodiment of the invention the control section comprises: a cooling device configured to cool the at least one actuation module.

According to another embodiment of the invention the robotic hand assembly further comprises: a routing plate configured to enable routing of the tendons to the associated actuation device.

According to another embodiment of the invention the routing plate comprises: a square routing plate; or a rectangular routing plate; or a hexagonal routing plate, or a circular routing plate.

According to another embodiment of the invention the routing plate comprises a plurality of grooves, each groove for routing a tendon.

According to one embodiment of the invention a sensing module for sensing a force applied to a tendon coupled at a first end to an actuatable joint is provided. The sensing module comprising: a first force sensor; a second force sensor; and a connection bar coupled between the first and second force sensors.

According to another embodiment of the invention the tendon comprise a first and second tendon, and wherein the first force sensor is configured to sense a force applied to the first tendon and the second force sensor is configured to sense a force applied to the second tendon.

According to another embodiment of the invention the first tendon is routed over the connection bar adjacent to the first force sensor, and the second tendon is routed over the connection bar adjacent to the second force sensor.

According to another embodiment of the invention the sensing module further comprises: a spool, wherein a second end of the tendon is coupled to the spool.

According to another embodiment of the invention the tendon comprise a first and second tendon, wherein the spool comprises a first spool and a second spool, and wherein the second end of the first tendon is coupled to the first spool and the second end of the second tendon is coupled to the second spool.

According to another embodiment of the invention the first spool and the second spool are configured to be moveable relative to one another, in order to adjust a tension in the first and second tendons.

According to another embodiment of the invention the sensing module further comprises: a securing device configured to secure the first and second spools relative to one another.

According to one embodiment of the invention a tensioner module for applying tension to a tendon coupled at a first end to an actuatable joint is provided. The tensioner module comprising: a pulley provided in a recess, wherein the tendon is routed around the pulley; and a biasing device coupled to the pulley biasing the pulley towards a first end of the recess to apply tension the tendon.

According to another embodiment of the invention the biasing device comprises a spring.

According to one embodiment of the invention an actuation device for actuating a joint is provided. The actuation device comprising: a sensing module configured to sense a force applied to a tendon coupled at a first end to the joint; and an actuation module configured to actuate the at least one joint.

According to another embodiment of the invention the actuation device further comprises: a tensioner module configured to apply tension the tendon.

According to another embodiment of the invention the actuation module comprises a motor and gears.

According to another embodiment of the invention the actuation module further comprises control means for controlling the motor and gears.

According to another embodiment of the invention the control means comprises a printed circuit board.

According to another embodiment of the invention the control section comprises: a cooling device configured to cool the at least one actuation module.

According to one embodiment of the invention a robotic finger digit is provided. The robotic finger digit comprising: a distal finger joint coupled between a distal finger part and a middle finger part; a middle finger joint coupled between the middle finger part and a proximal finger part; an extend tendon coupled at a first end to the distal finger joint, and coupled at a second end to an actuation device; and a flex tendon coupled at a first end to the distal finger joint, and coupled at a second end to the actuation device, wherein the actuation device is configured to move the extend tendon and the flex tendon substantially the same distance in order to flex and/or extend the robotic finger digit.

According to another embodiment of the invention the distal finger joint is configured to enable the distal finger part to move about a first axis.

According to another embodiment of the invention the middle finger joint is configured to enable the middle finger part to move about a second axis, parallel to the first axis.

According to another embodiment of the invention the actuation device comprises a motor, or an air muscle device.

According to another embodiment of the invention the robotic finger digit further comprises: a loopback tendon coupled at a first end to the distal finger joint, and configured to bias the robotic finger digit in a extend position.

According to another embodiment of the invention the robotic finger digit further comprises: a biasing device provided at a second end of the loopback tendon.

According to another embodiment of the invention in use, activation of the extend tendon and the flex tendon results in actuation of the distal finger joint and the middle finger joint.

According to one embodiment of the invention a wrist joint assembly for a robotic hand is provided. The wrist joint assembly comprising: a first wrist joint configured to enable the robotic hand to move about a first axis, and coupled to a first wrist joint tendon; a second wrist joint configured to enable the robotic hand to move about a second axis orthogonal to the first axis, and coupled to a second wrist joint tendon, the second wrist joint comprising a substantially circular guide surface for the second wrist joint tendon; and an actuation device configured to actuate the first wrist joint tendon and the second wrist joint tendon substantially the same distance in order to actuate the first and second wrist joints.

According to another embodiment of the invention the first wrist joint tendon comprise a first flex wrist joint tendon and a first extend wrist joint tendon, and wherein the second wrist joint tendon comprise a second flex wrist joint tendon and a second extend wrist joint tendon

BRIEF DESCRIPTION OF THE FIGURES

For a better understanding of the invention and as to how the same may be carried into effect reference will now be made, by way of example only, to the accompanying figures, in which.

DETAILED DESCRIPTION

Additional advantages and novel features of the invention will be set forth in part in the description which follows, and in part will become apparent to those skilled in the art upon examination of the following and accompanying figures or may be learned by practice of the invention.

Figure 1A:
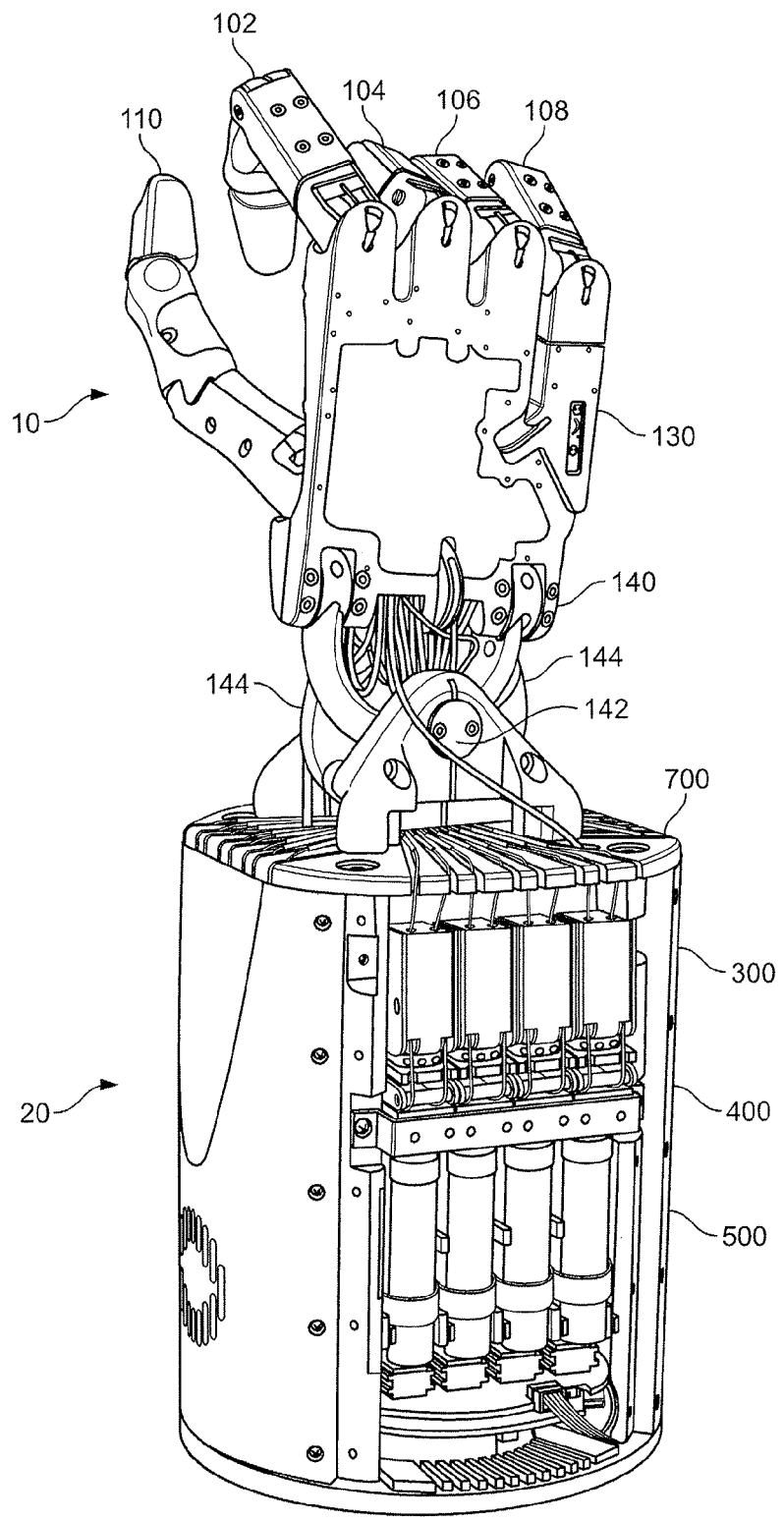
FIG. 1A illustrates a motorised robotic hand.
Figure 1B:
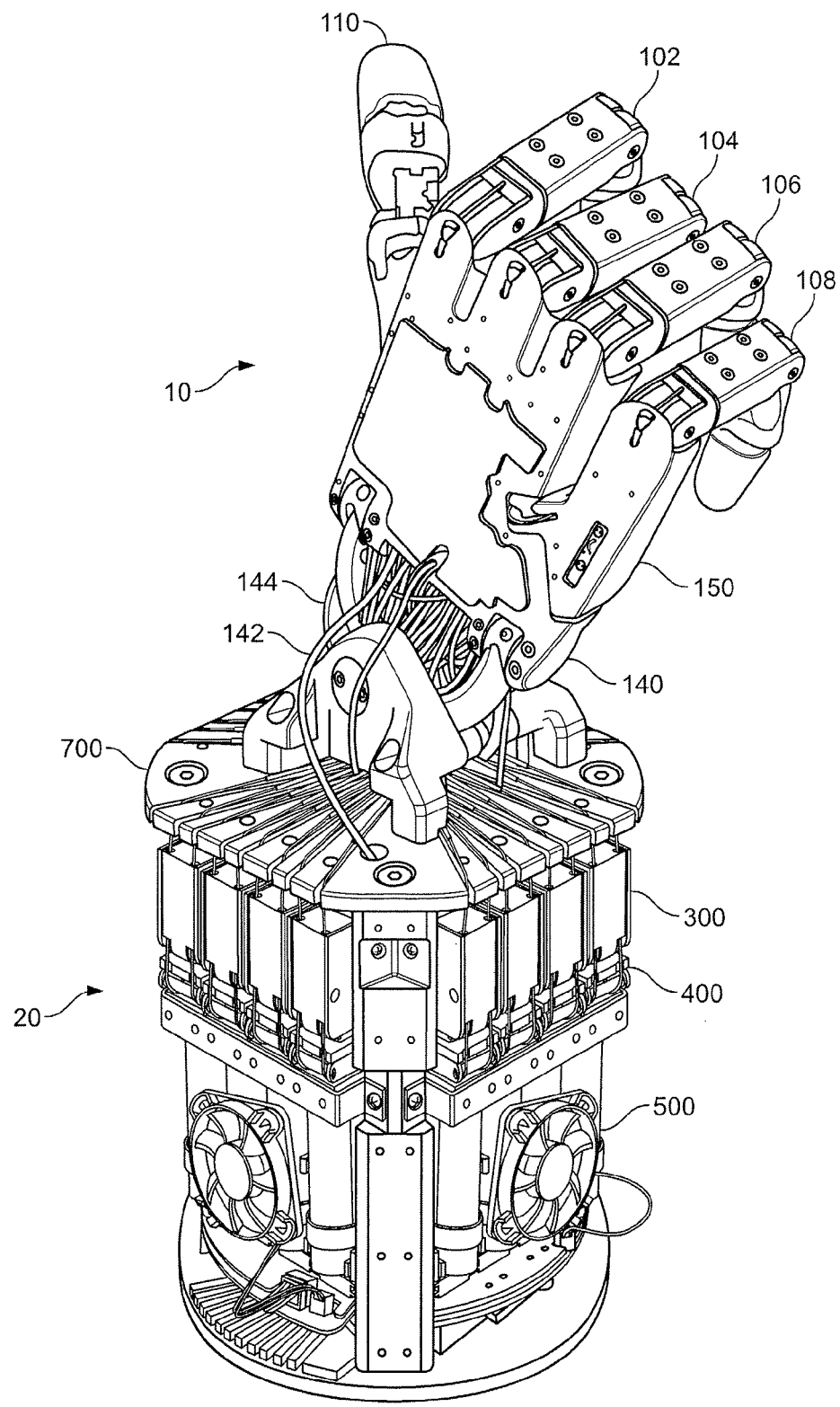
FIG. 1B illustrates a motorised robotic hand.
Figure 1C:
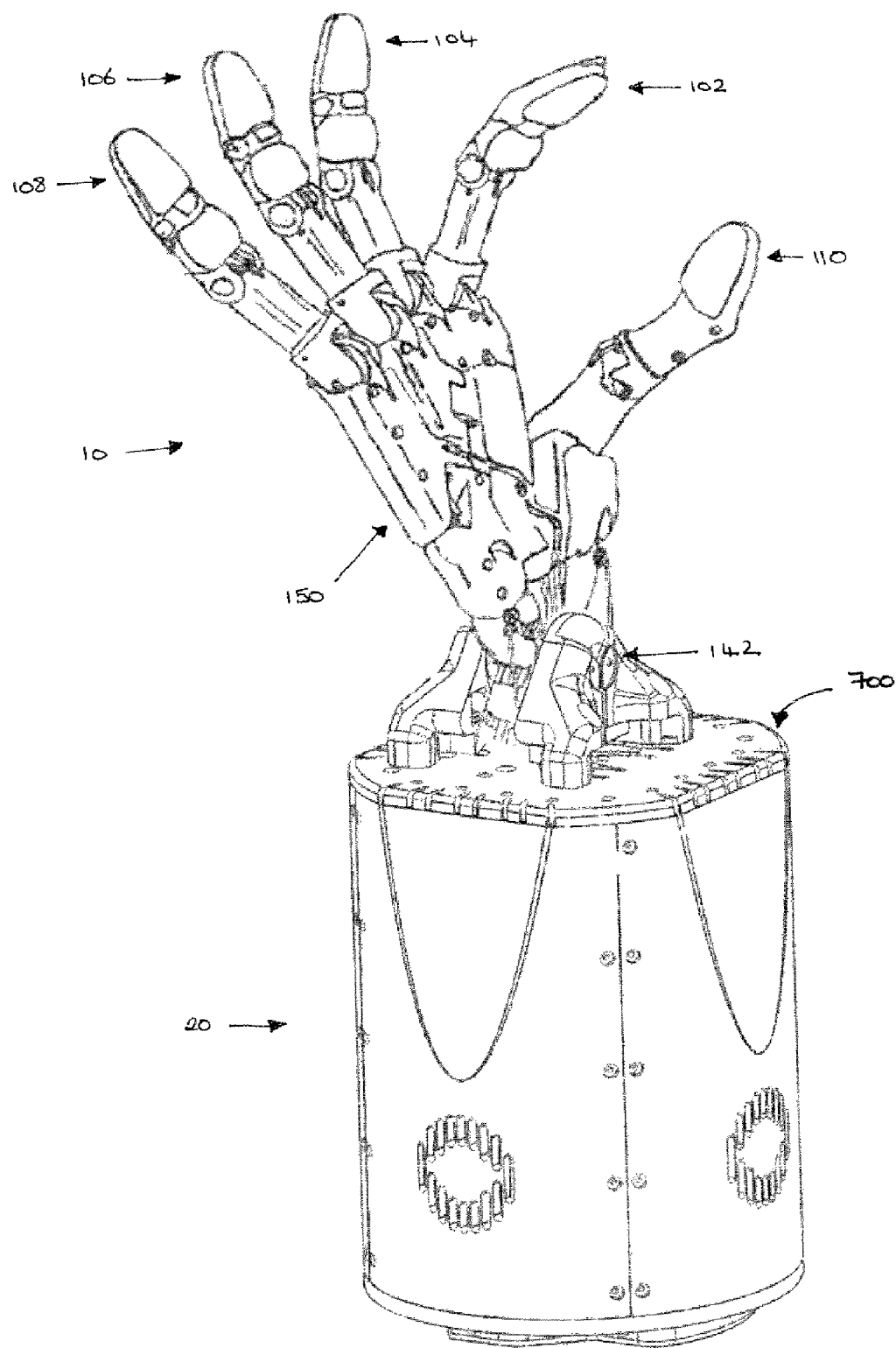
FIG. 1C illustrates schematically a motorised robotic hand.

FIGS. 1A, 1B and 1C illustrate a motorised robotic hand. As can be seen from FIGS. 1A, 1B and 1C, a motorised robotic hand comprises a hand section 10 and a control section 20. The hand section 10 comprises four finger digits 102, 104, 106, 108 and a thumb digit 110, which substantially imitate the digits of a human hand, a palm section 150, which substantially imitates a human palm, and a wrist section 140, 142, 144, which substantially imitates a human wrist. The control section 20 comprises a plurality of actuation devices, each actuation device comprising a tensioner module 300, a sensing module 400 and an actuation module 500. FIG. 1A illustrates four actuation devices, whilst FIG. 1B illustrates eight actuation devices. Each actuation device enables movement of one component, such as one joint of a digit, of the robotic hand section 10. As can be seen from FIG. 1B, a fan may be provided in order to cool the actuation modules 500.

Figure 2:
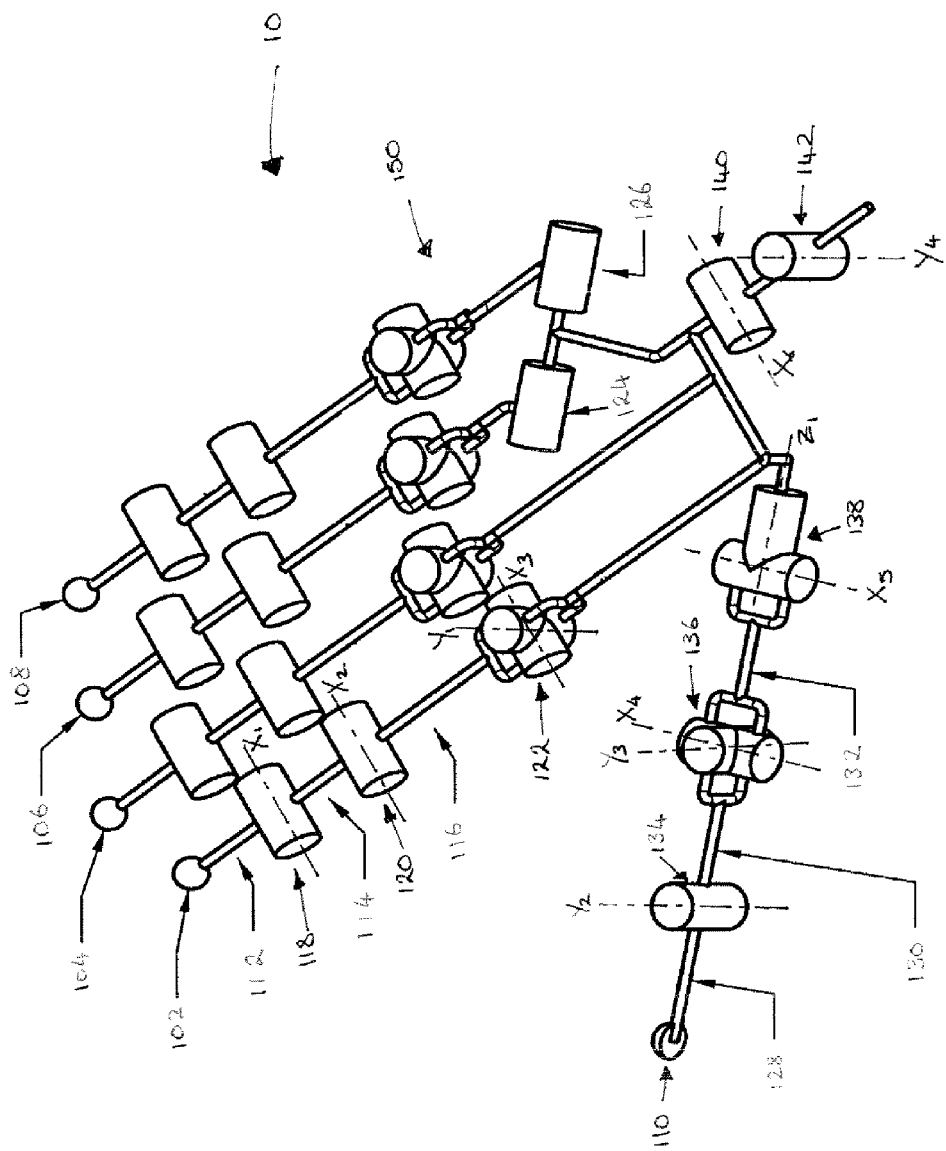
FIG. 2 illustrates schematically components of a robotic hand.

FIG. 2 illustrates schematically exemplary components of the robotic hand section 10. Each finger digit 102, 104, 106, 108 includes a distal finger part 112, a middle finger part 114 and a proximal finger part 116. Only the distal, middle and proximal finger parts 112, 114, 116 of finger digit 102 are labelled in FIG. 2. However, it is clear from FIG. 2 that finger digits 104, 106 and 108 also include finger parts 112, 114, 116.

The distal finger part 112 and the middle finger part 114 are connected by a distal finger joint 118. The distal finger joint 118 enables the distal finger part 112 to move about an X axis $X_1$, illustrated in FIG. 2, with respect to the middle finger part 114. The middle finger part 114 and the proximal finger part 116 are connected by a middle finger joint 120. The middle finger joint 120 enables the middle finger part 114 to move about an X axis $X_2$, illustrated in FIG. 2, with respect to the proximal finger part 116. Finally, the proximal finger part 116 is connected to the palm section 150 by a proximal finger joint 122. The proximal finger joint 122 enables the proximal finger part 116 to move about an X axis $X_3$ and about a Y axis $Y_1$, illustrated in FIG. 2, with respect to the palm section 150. Axes $X_1$, $X_2$ and $X_3$ are parallel to one another. Axis $Y_1$ is orthogonal to axes $X_1$, $X_2$ and $X_3$. Only the distal, middle and proximal finger joints 118, 120, 122 of finger digit 102 are labelled in FIG. 2. However, it is clear from FIG. 2 that finger digits 104, 106 and 108 also include finger joints 118, 120, 122.

The thumb digit 110 includes a distal thumb part 128, a middle thumb part 130 and a proximal thumb part 132.

The distal thumb part 128 and the middle thumb part 130 are connected by a distal thumb joint 134. The distal thumb joint 134 enables the distal thumb part 128 to move about a Y axis $Y_2$, illustrated in FIG. 2, with respect to the middle thumb part 130. The middle thumb part 130 and the proximal thumb part 132 are connected by a middle thumb joint 136. The middle thumb joint 136 enables the middle thumb part 130 to move about a Y axis $Y_3$ and an X axis $X_4$, illustrated in FIG. 2, with respect to the proximal thumb part 132. Finally, the proximal thumb part 132 is connected to the palm section 150 by a proximal thumb joint 138. The proximal thumb joint 138 enables the proximal thumb part 132 to move about an X axis $X_5$, and about a Z axis $Z_1$, illustrated in FIG. 2, with respect to the palm section 150. Axes $Y_2$ and $Y_3$ are parallel to one another. Axes $X_4$ and $X_5$ are parallel to one another. Axes $X_4$ and $X_5$ are orthogonal to axes $Y_2$ and $Y_3$. Finally, axis $Z_1$ is orthogonal to axes $Y_2$ and $Y_3$, and axes $X_4$ and $X_5$.

First palm joint 124 and second palm joint 126 enable movement of the palm section 150 such as the thumb digit 110 can touch the third and fourth finger digits 106 and 108. However, other palm sections 150 may also be used. For example, the palm sections 150 illustrated in FIG. 1C only comprises a second palm joint 126 to enable movement of the palm section 150.

The hand section 10 is connected to the control section 20 via the wrist section 140, 142. First wrist joint 140 enables the hand section 10 to move about an X axis $X_6$, illustrated in FIG. 2, with respect to the control section 20 (not illustrated in FIG. 2). Second wrist joint 142 enables the hand section 10 to move about a Y axis $Y_4$, illustrated in FIG. 2, with respect to the control section 20 (not illustrated in FIG. 2). Axes $X_6$ and $Y_4$ are orthogonal to one another.

The hand section 10 illustrated schematically in FIG. 2 is provided for illustrative purposes only and other hand sections 10 comprising different finger and thumb digit arrangements, and different palm and wrist section arrangements may be used in combination with the control section 20 of the invention.

Each joint enables movement in a first direction about an axis, and in a second direction, opposite to the first direction, about the axis. For example, in FIG. 3A, joint 560 enables movement of part 570 in a first direction 580A about an axis (through the page of FIG. 3A), and in a second direction 580B, opposite to the first direction 580A, about the axis. In FIG. 3B, joint 650 enables movement of part 660 in a first direction 670A about an axis (through the page of FIG. 3B), and in a second direction 670B, opposite to the first direction 670A, about the axis.

Joints 122, 136 and 138, illustrated in FIG. 2, can be thought of as essentially two separate joints. Proximal finger joint 122 comprises a first proximal finger joint enabling movement in a first direction about axis $X_3$, and in a second direction, opposite to the first direction, about axis $X_3$, and a second proximal finger joint enabling movement in a first direction about axis $Y_1$, and in a second direction, opposite to the first direction, about axis $Y_1$. Middle thumb joint 132 comprises a first middle thumb joint enabling movement in a first direction about axis $Y_3$, and in a second direction, opposite to the first direction, about axis $Y_3$ and a second middle thumb joint enabling movement in a first direction about axis $X_4$, and in a second direction, opposite to the first direction, about axis $X_4$. Proximal thumb joint 138 comprises a first proximal thumb joint enabling movement in a first direction about axis $X_5$, and in a second direction, opposite to the first direction, about axis $X_5$ and a second proximal thumb joint enabling movement in a first direction about axis $Z_1$, and in a second direction, opposite to the first direction, about axis $Z_1$.

Two tendons are attached, at a first end, to each joint. The two tendons are also connected, at a second end, to an actuation device (such as control section 20 of FIGS. 1A to 1C) in order to actuate each joint in the first direction, and in the second direction, opposite to the first direction. An actuation device is required for each joint.

In one embodiment, one tendon could be used, looped around and connected to the joint at a mid section. The first and second ends of the tendon being connected to an actuation device in order to actuate the joint in the first direction and in the second direction, opposite to the first direction.

Figure 3A:
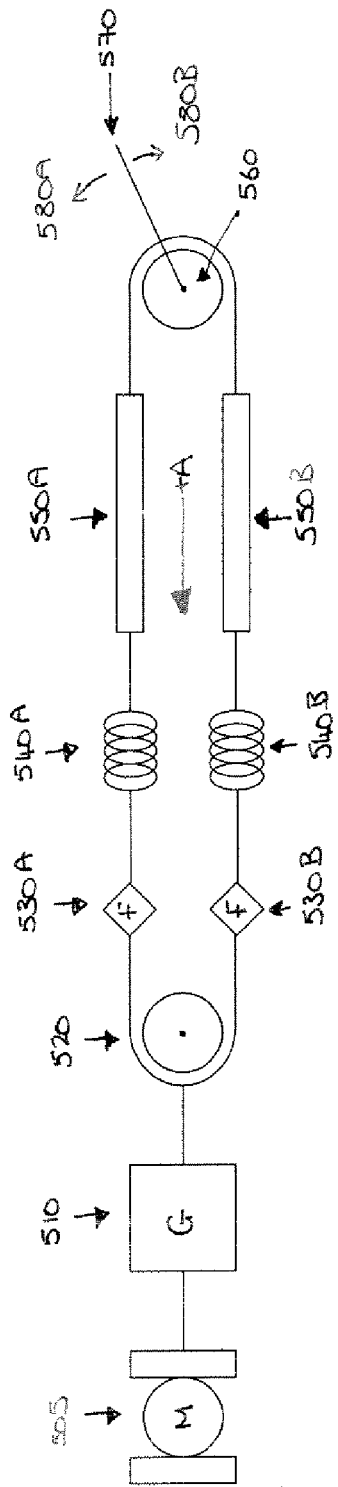
FIG. 3A illustrates schematically components for actuating a digit of a robotic hand.
Figure 3B:
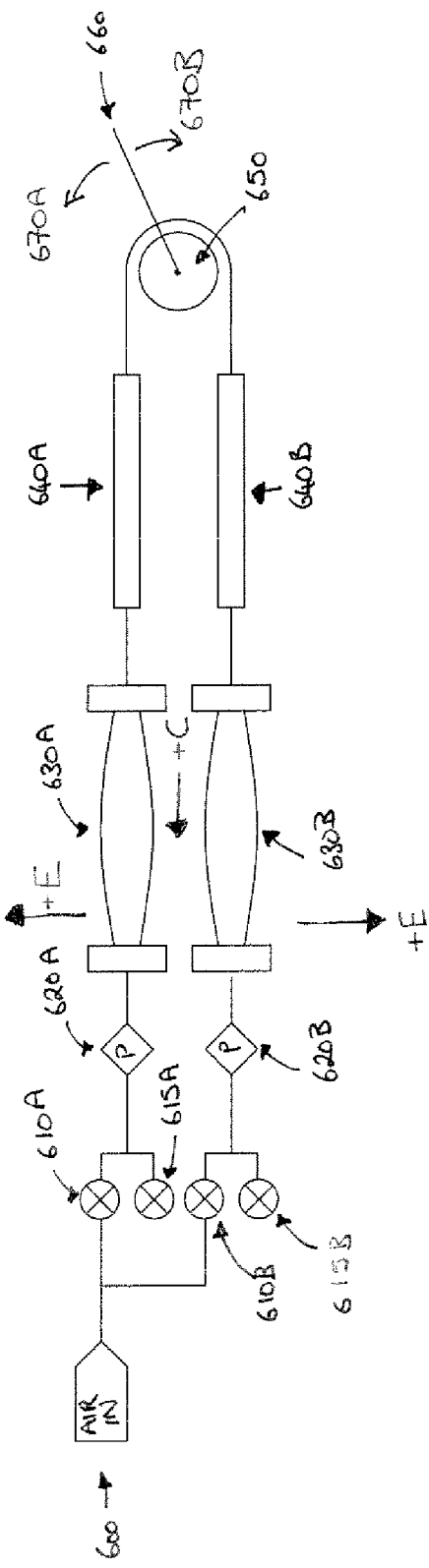
FIG. 3B illustrates schematically components for actuating a digit of a robotic hand.

FIGS. 3A and 3B illustrates schematically components for actuating a joint. FIG. 3A illustrates schematically a motor driven actuation device (such as control section 20 of FIGS. 1A to 1C) and FIG. 3B illustrates an air muscle driven actuation device.

The motor driven actuation device of FIG. 3A comprises a motor 505; gears 510; a first spool 520; a first force sensor 530A; a second force sensor 530B; a first tensioner 540A; a second tensioner 540B; a first tendon 550A; a second tendon 550B; a second spool 560; and a part 570. The motor 505 is connected to the gears 510, which in turn are connected to the first spool 520. The first spool 520 is connected to a first end of the first and second tendons 550A, 550B, via the first and second force sensors 530A, 530B and the first and second tensioners 540A, 540B respectively. The first and second tendons 550A, 550B are also connected at a second end to the part 570 via the second spool 560.

Activation of the first tendon 550A in direction +A, by means of the motor 505 and gears 510, results in rotation of the spool in a first direction about an axis running through the page of FIG. 3A, and thus movement of the part 570 in a direction 580A. Activation of the second tendon 550B in direction +A, by means of the motor 505 and gears 510, results in rotation of the spool 560 in a second direction about an axis running through the page of FIG. 3A, opposite to the first direction, and thus movement of the part 570 in a direction 580B.

The first and second tendons 550A, 550B, are connected to the first and second force sensors 530A, 530B via the first and second tensioners 540A, 540B respectively. The first and second force sensors 530A, 530B sense the amount of force applied to each tendons 550A, 550B. Control of the amount of force applied to each of the first and second tendons 550A, 550B can be used to control the amount of movement of each of the first and second tendons 550A, 550B, and thus the amount of movement of the part 570 in direction 580A or in direction 580B.

The air muscle driven actuation device of FIG. 3B comprises an air inlet 600; first inlet valve 610A; second inlet valve 610B; first outlet valve 615A; second outlet valve 615B; first pressure sensor 620A; second pressure sensor 620B; first air muscle 630A; second air muscle 630B; first tendon 640A; second tendon 640B; a spool 650; and a part 660. The air inlet 600 is connected to the first and second inlet valves 610A, 610B, which in turn are connected to the first and second air muscles 630A, 630B via the first and second pressure sensors 620A, 620B respectively. The first and second air muscle 630A, 630B are connected to the first and second tendons 640A, 640B respectively, which are connected to the part 660 via the spool 650.

When air is provided in the first air muscle 630A, via the first inlet valve 610A, the first air muscle 630A expands in direction +E and contracts in direction +C. Contraction of the first air muscle 630A in direction +C result in the first tendon 640A moving in direction +C and rotation of the spool 650 in a first direction about an axis running through the page of FIG. 3B. This results in movement of the part 660 in a direction 670A. In order to provide air to the first air muscle 630A, the first outlet valve 615A is closed, the second inlet valve 610B is closed, and the second outlet valve 615B is open. Contraction of the first air muscle 630A in direction +C, results in extension of the second air muscle 630B in direction −C and contraction of the second air muscle 630B in direction −E.

Conversely, when air is provided in the second air muscle 630B, via the second inlet valve 610B, the second air muscle 630B expands in direction +E and contracts in direction +C. Contraction of the second air muscle 630B in direction +C result in the second tendon 640B moving in direction +C and rotation of the spool 650 in a second direction, opposite to the first direction, about an axis running through the page of FIG. 3B. This results in movement of the part 660 in a direction 670B. In order to provide air to the second air muscle 630B, the second outlet valve 615B is closed, the first inlet valve 610A is closed, and the first outlet valve 615A is open. Contraction of the second air muscle 630B in direction C, result in extension of the first air muscle 630A in direction −C and contraction of the first air muscle 630A in direction −E.

The first and second air muscles 630A, 630B are connected to the first and second pressure sensor 620A, 620B respectively. The first and second pressure sensor 620A, 620B sense the amount of air pressure applied to each air muscle 630A, 630B. The amount of air pressure applied to each air muscle 630A, 630B is modulated by the first and second inlet valves 610A, 610B, and the first and second outlet valves 615A, 615B. Control of the amount of air pressure applied to each air muscle 630A, 630B can be used to control the amount of movement of each of the first and second tendons 640A, 640B, and thus the amount of movement of the part 660 in direction 670A or in direction 670B.

The parts 570 and 660, may represent, for example, one of the finger or thumb digits 102, 104, 106, 108, 110 of the hand section 10, such as the distal finger part 112, or proximal thumb part 132 of FIG. 2. In this case, the spools 560, 650, represent the distal finger joint 118 and (one of) the proximal thumb joint 138 respectively. The parts 570 and 660, may also represent, for example, one of the other parts of the hand section 10, for example the palm section 150 of FIG. 2, in which case the spools 560, 650 may represent first wrist joint 142. In addition, parts 570 and 660, may also represent, for example, the third finger digit 106 of FIG. 2, in which case the spools 560, 650 may represent first palm joint 124.

The motor driven actuation device of FIG. 3A is advantageous over the air muscle driven actuation device of FIG. 3B. This is because in order to move the part 570, the motor driven actuation device only requires one motor 505 and one set of gears 510, whereas in order to move the part 660, the air muscle driven actuation device requires two air muscles 630A, 630B and four valves 610A, 610B, 615A, 615B. Consequently, the air muscle driven actuation device is larger than the motor driven actuation device. In addition, the motor driven actuation device is capable of providing more accurate movement for the part 570 than the air muscle driven actuation device.

Each joint of the robotic hand section 10 requires its own actuation device in order to actuate that joint. For example, in the hand section 10 illustrated in FIG. 2, each finger digit 102, 104, 106, 108 requires four actuation devices, and the thumb digit 110 requires five actuation devices. In addition, the palm section 150 requires two actuation devices, and the wrist 140, 142 requires two actuation devices. In total, the hand section 10 illustrated in FIG. 2 requires twenty five actuation devices.

Different arrangements of the hand section may require a different number of actuation devices. For example, the palm section 150 may not be required to move, or may only be required to have limited movement, in which case both of, or one of, the joints 124, 126 may not be required, resulting in fewer actuation devices.

In addition, a human finger digit, in most instances, is not capable of moving the distal finger part 112, without also moving the middle finger part 114. Consequently, in order to realistically mimic a human hand, the distal finger joint 118 and middle finger joint 120 may be actuated together, as described with reference to FIGS. 4A and 4B below. In this instance, each finger digit 102, 104, 106, 108 would require three actuation devices, and the hand section 10 illustrated in FIG. 2 requires only twenty one actuation devices.

Figure 4A:
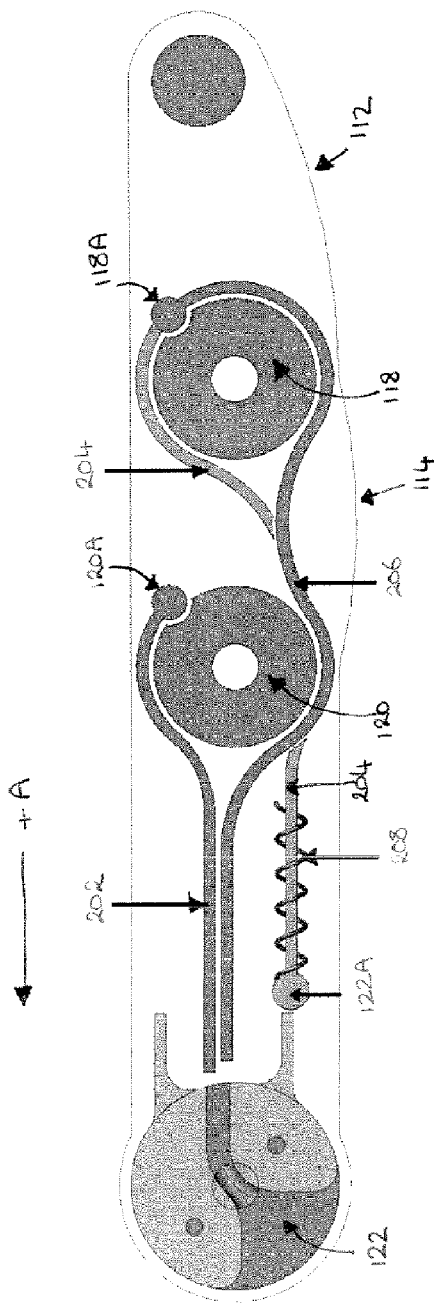
FIG. 4A illustrates schematically a digit of a robotic hand.

FIG. 4A illustrates schematically a first arrangements for connecting a distal finger joint 118 and a middle finger joint 120 for actuation together. Although not illustrated in FIGS. 4A and 4B, a distal finger part is connected to the distal finger joint, the distal finger joint 118 and a middle finger joint 120 are connected by a middle finger part, and the middle finger joint 120 and proximal finger joint 122 are connected by a proximal finger part.

As can be seen in FIG. 4A, a first end of an extend tendon 202 is connected to the middle finger joint 120 at middle connection point 120A. A second end of the extend tendon 202, opposite to the first end of the extend tendon 202, is connected to an actuation device (not illustrated). A first end of a loopback tendon 204 is connected to the distal finger joint 118 at distal connection point 118A. A second end of the loopback tendon 204, opposite to the first end of the loopback tendon 204, is provided with a loopback tendon nodule 122A. A biasing device 208, in one embodiment a spring, is provided on the loopback tendon 204 between the loopback tendon nodule 122A and point 204. The loopback tendon nodule 122A and the biasing device 208 are provided in a channel (not illustrated). Finally, a first end of a flex tendon 206 is connected to the distal finger joint 118 at distal connection point 118A. A second end of the flex tendon 206, opposite to the first end of the flex tendon 206, is connected to the actuation device (not illustrated).

The extend tendon 202 and the flex tendon 206 may be guided through, or around the proximal finger joint 122, so as not to hamper movement of the proximal finger joint 122. The extend tendon 202 and the flex tendon 206 are not connected to the proximal finger joint 122. In addition, the flex tendon 206 is not connected to the middle finger joint 120.

Activation of the actuation device to which the extend tendon 202 and flex tendon 206 are connected results in the distal finger part moving about the distal finger joint 118 and the middle finger part moving about middle finger joint 120, such that the finger digit bends or straightens.

In order to bend the finger digit, the flex tendon 206 is pulled in direction +A resulting in the distal finger part (not illustrated) moving about the distal finger joint 118. In addition, the loopback tendon 204 is pulled in direction −A, resulting in the loopback tendon nodule 122A being pulled along the channel (in direction −A) compressing the biasing device 208. Since the distal finger joint 118 is connected to the middle finger joint 120 by a middle finger part, movement of the distal finger joint 118, results in movement of the middle finger part, resulting in movement of the middle finger joint 120, ultimately bending the finger digit.

In order to straighten the finger digit, the extend tendon 202 is pulled in direction +A, resulting in movement of the middle finger joint 120. Since the distal finger joint 118 is connected to the middle finger joint 120 by a middle finger part, movement of the middle finger joint 120, results in movement of the distal finger joint 118. In addition, the loopback tendon 204 is moved in direction +A and the biasing device 208 is released, ultimately straightening the finger digit.

The biasing device 208 biases the finger digit in the straight position (illustrated in FIG. 4A) and helps to straighten the finger digit after bending.

Figure 4B:
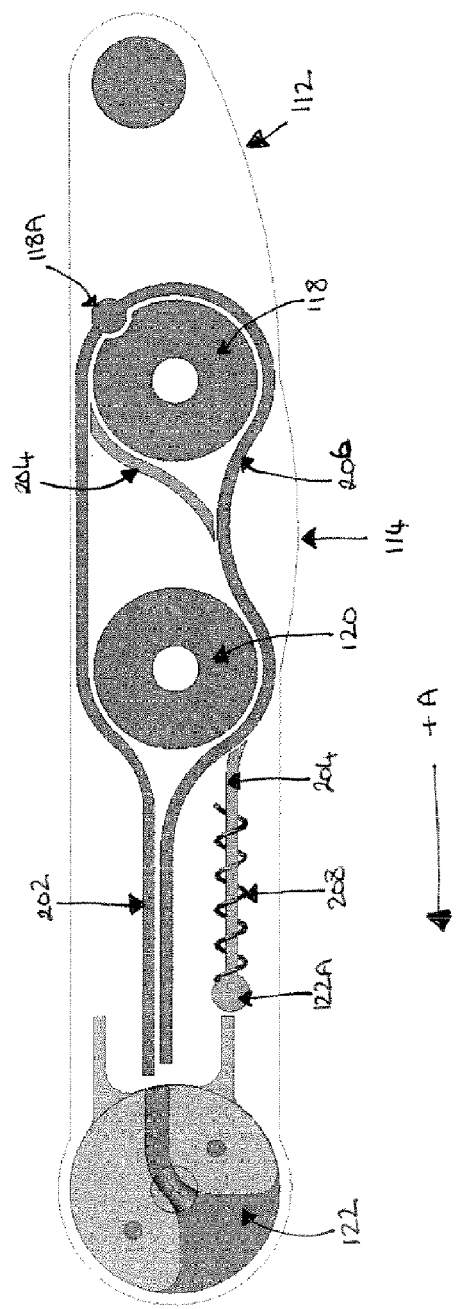
FIG. 4B illustrates schematically a digit of a robotic hand.

FIG. 4B illustrates schematically a second arrangements for connecting a distal finger joint 118 and a middle finger joint 120 for actuation. As can be seen in FIG. 4B, a first end of an extend tendon 202 is connected to the distal finger joint 118 at distal connection point 118A. A second end of the extend tendon 202, opposite to the first end of the extend tendon 202, is connected to the actuation device (not illustrated). A first end of a loopback tendon 204 is connected to the distal finger joint 118 at distal connection point 118A. A second end of the loopback tendon 204, opposite to the first end of the loopback tendon 204, is provided with a loopback tendon nodule 122A. A biasing device 208, in one embodiment a spring, is provided on the loopback tendon 204 between the loopback tendon nodule 122A and point 204. The loopback tendon nodule 122A and the biasing device 208 are provided in a channel (not illustrated). Finally, a first end of a flex tendon 206 is connected to the distal finger joint 118 at distal connection point 118A. A second end of the flex tendon 206, opposite to the first end of the flex tendon 206, is connected to the actuation device (not illustrated).

The extend tendon 202 and the flex tendon 206 may be guided through, or around the proximal finger joint 122, so as not to hamper movement of the proximal finger joint 122. The extend tendon 202 and the flex tendon 206 are not connected to the proximal finger joint 122. In addition, the extend tendon 202 and the flex tendon 206 are not connected to the middle finger joint 120.

Activation of the actuation device to which the extend tendon 202 and flex tendon 206 are connected results in the distal finger part moving about the distal finger joint 118 and the middle finger part moving about middle finger joint 120, such that the finger digit bends or straightens.

In order to bend the finger digit, the flex tendon 206 is pulled in direction +A resulting in the distal finger part (not illustrated) moving about the distal finger joint 118. In addition, the loopback tendon 204 is pulled in direction −A, resulting in the loopback tendon nodule 122A being pulled along the channel (in direction −A) compressing the biasing device 208. Since the distal finger joint 118 is connected to the middle finger joint 120 by a middle finger part, movement of the distal finger joint 118, results in movement of the middle finger part, resulting in movement of the middle finger joint 120, ultimately bending the finger digit.

In order to straighten the finger digit, the extend tendon 202 is pulled in direction +A, resulting in movement of the distal finger joint 118. Since the distal finger joint 118 is connected to the middle finger joint 120 by a middle finger part, movement of the distal finger joint 118, results in movement of the middle finger joint 120. In addition, the loopback tendon 204 is moved in direction +A and the biasing device 208 is released, ultimately straightening the finger digit.

The biasing device 208 biases the finger digit in the straight position (illustrated in FIG. 4B) and helps to straighten the finger digit after bending.

The connecting arrangements of FIGS. 4A and 4B can utilise either a motor driven actuation device, such as illustrated in FIG. 3A, or an air muscle driven actuation device, such as illustrated in FIG. 3B.

The connecting arrangement of FIG. 4B is advantageous over the connecting arrangement of FIG. 4A, since the extend tendon 202 and the flex tendon 206 of FIG. 4B are required to move substantially the same distance in order to bend and straighten the finger digit. In contrast, in the connecting arrangement of FIG. 4A, the flex tendon 206 is required to move a substantially greater distance than the extend tendon 202 in order to bend and straighten the finger digit. The result of having both tendons 202, 206 moving substantially the same distance is more accurate movement control, and simpler actuation control.

In one embodiment, the loop back tendon 204 may be an elasticated material. In this embodiment, the biasing device 204 may not be required.

Figure 5:
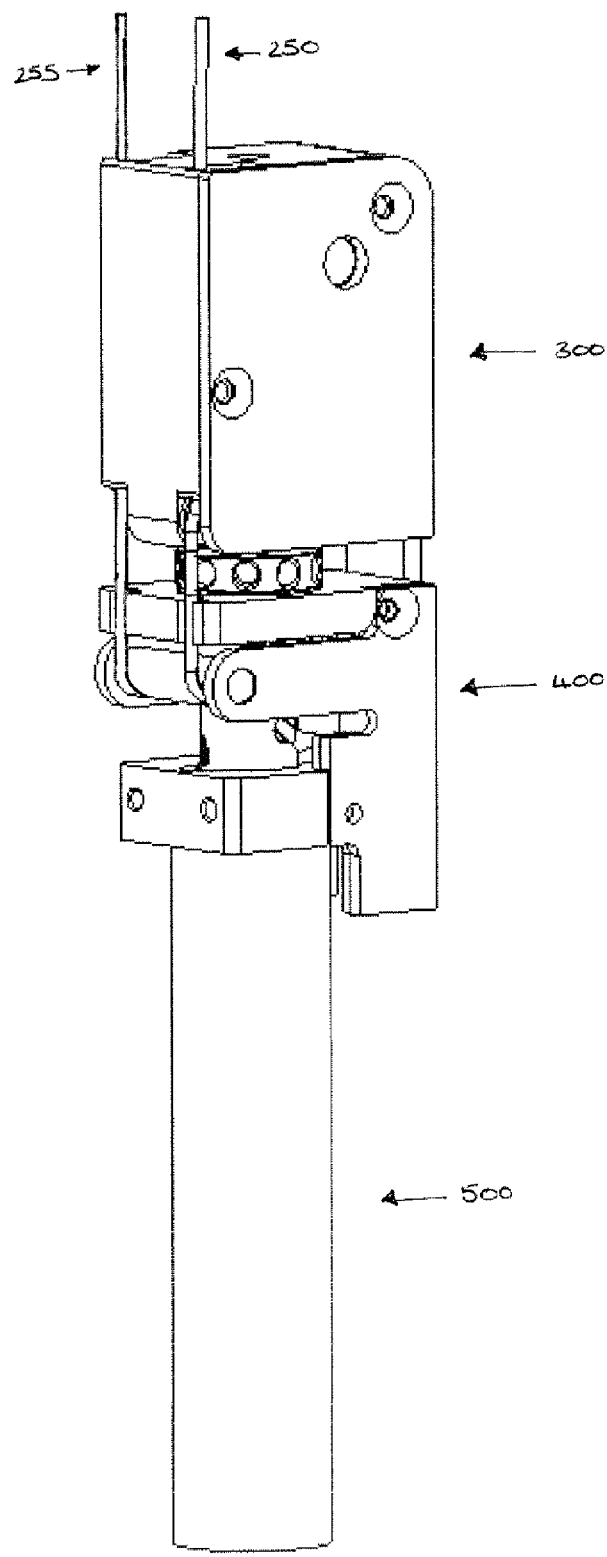
FIG. 5 illustrates schematically a perspective view of components for actuating a digit of a robotic hand.

FIG. 5 illustrate a perspective view of one of the plurality of actuation devices provided in the control section 20 of FIGS. 1A, 1B and 1C. As stated previously, each actuation device comprises a tensioner module 300, a sensing module 400 and an actuation module 500. Each actuation device enables movement of one component, such as one joint of a digit, of the robotic hand section 10, by controlling movement of a flex tendon 250 and an extend tendon 255. Although not illustrated the flex tendon 250 and extend tendon 255 may be connected to any joint of the robotic hand section 10.

Figure 6:
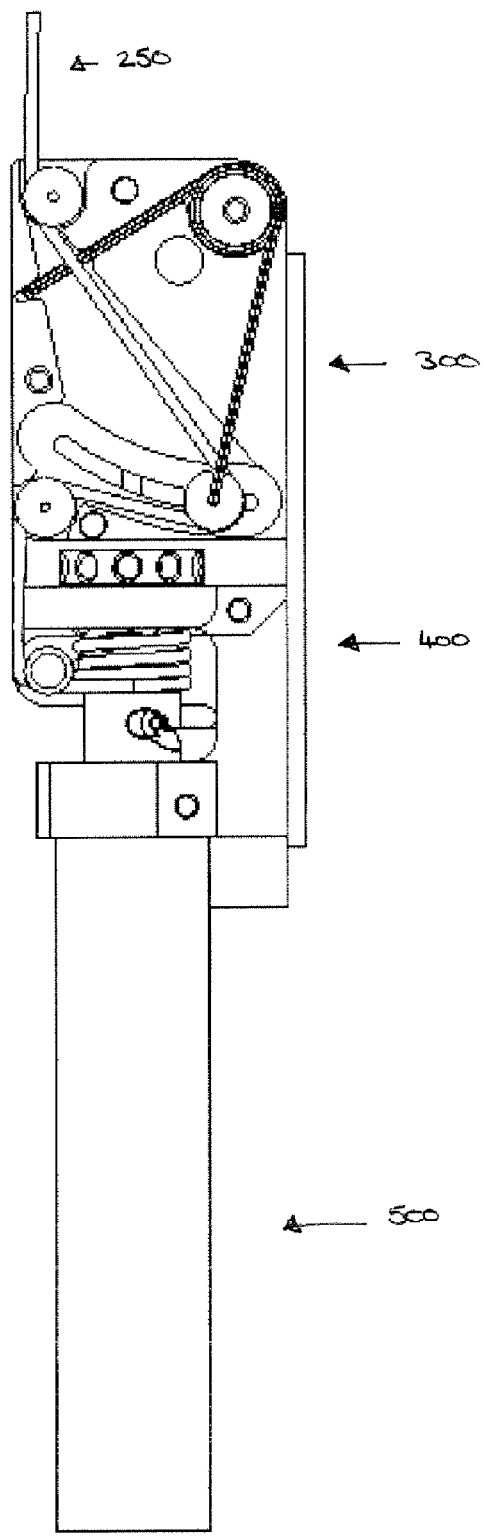
FIG. 6 illustrates schematically a side view cut-through of the components of FIG. 5.

FIG. 6 illustrates a side view of the actuation device of FIG. 5. The casing surrounding the tensioner module 300 and the sensing module 400 has been removed in order to more clearly describe the components of the tensioner module 300 and sensing module 400. The tendon 250 is connected to the actuation module 500 via the tensioner module 300 and the sensing module 400.

In this embodiment, the actuation module 500 comprises a motor and gears. The motor and gears may be assembled as a single unit. A motor and gears are well known to a person skilled in the art and thus are not described in further detail in this application. In addition, each set of motor and gears may be provided with its own printed circuit board (PCB) for controlling the motor and gears. In the arrangement illustrated in FIGS. 1A and 1B, the PCB is integrated onto the back of each motor. However alternative arrangements may be utilised.

Figure 7:
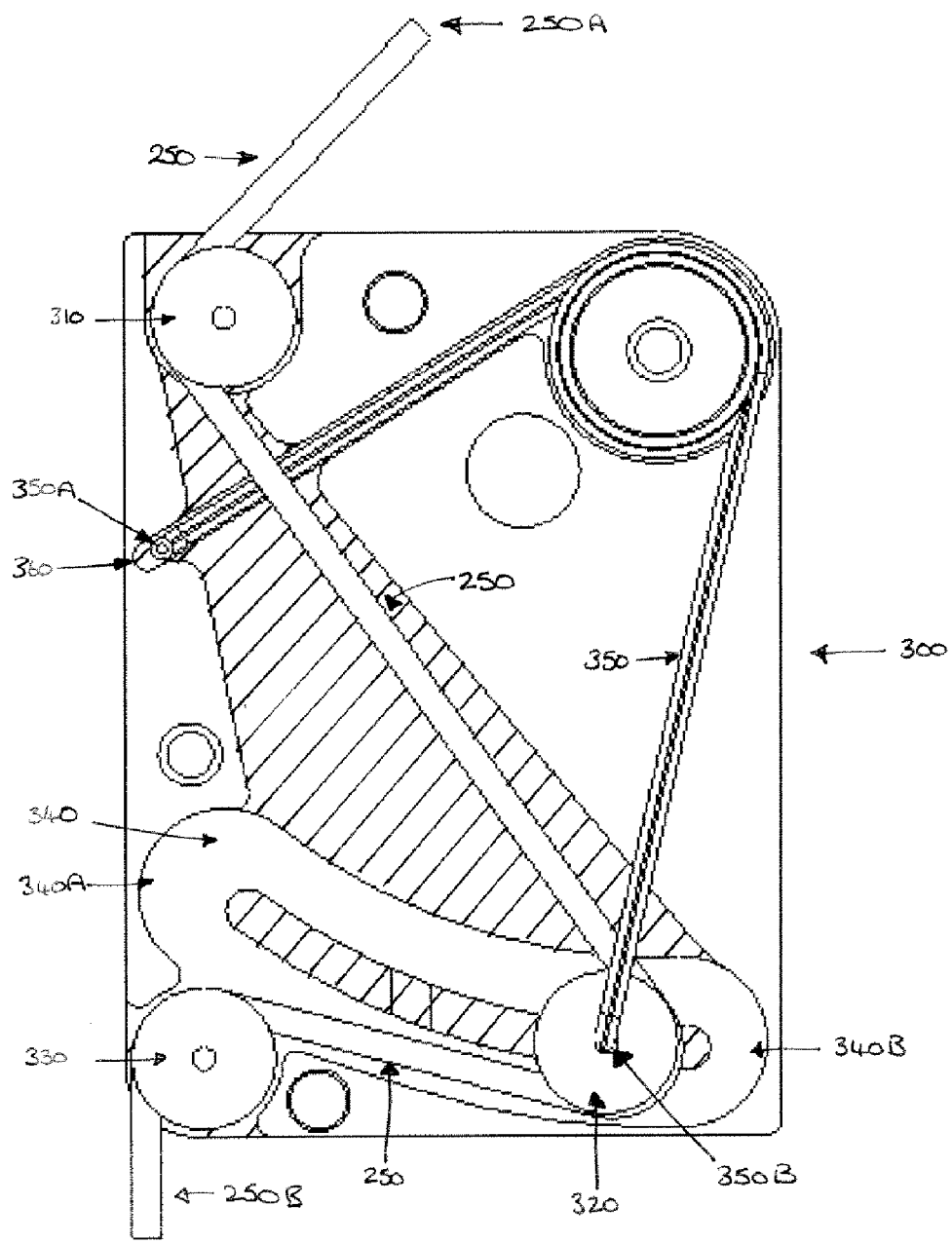
FIG. 7 illustrates schematically a side view of a tensioner module.

FIG. 7 illustrates a side view of the tensioner module 300 comprising a first pulley 310, a second pulley 320 and a third pulley 330. The tendon 250 is routed through the tensioner module 300 around the first, second and third pulley 310, 320, 330 respectively. The tendon 250 may be connected at first end 250A to a joint of the robotic hand section 10 (not illustrated). The tendon 250 may also be connected at a second end 250B to the sensor module 400 (not illustrated).

The tensioner module 300 also comprises a tendon biasing device 350, in one embodiment a spring. A first end 350A of the spring is provided in a recess 360 in the tensioner module 300, such that the first end 350A of the spring cannot move. A second end 350B of the spring is connected to the second pulley 320. The second pulley 320 is provided in a curved recess 340. The second end 350B of the spring, and thus the second pulley 320, is biased towards a second end 340B of the recess 340 in order to maintain tension in the tendon 250, keeping the tendon 250 taught.

In one embodiment, the first end 350A of the spring is provided behind the tendon 250, whilst the second end 350B of the spring is provided in front of the tendon 250.

Figure 9:
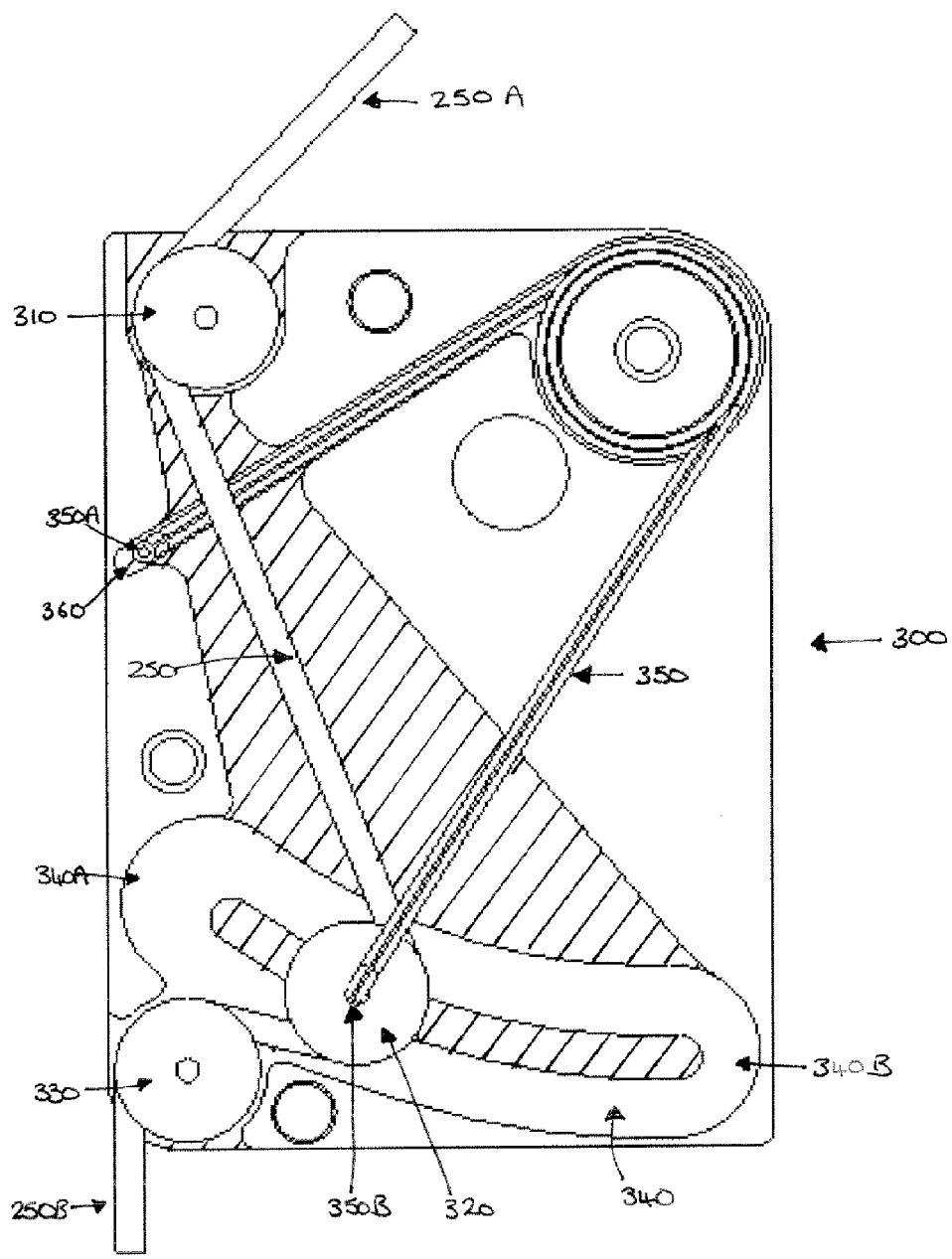
FIG. 9 illustrates schematically another side view of a tensioner module.

FIG. 9 illustrates a side view of the tensioner module 300 where the second pulley 320 has moved along the recess 340 towards a first end 340A of the recess 340.

Figure 8:
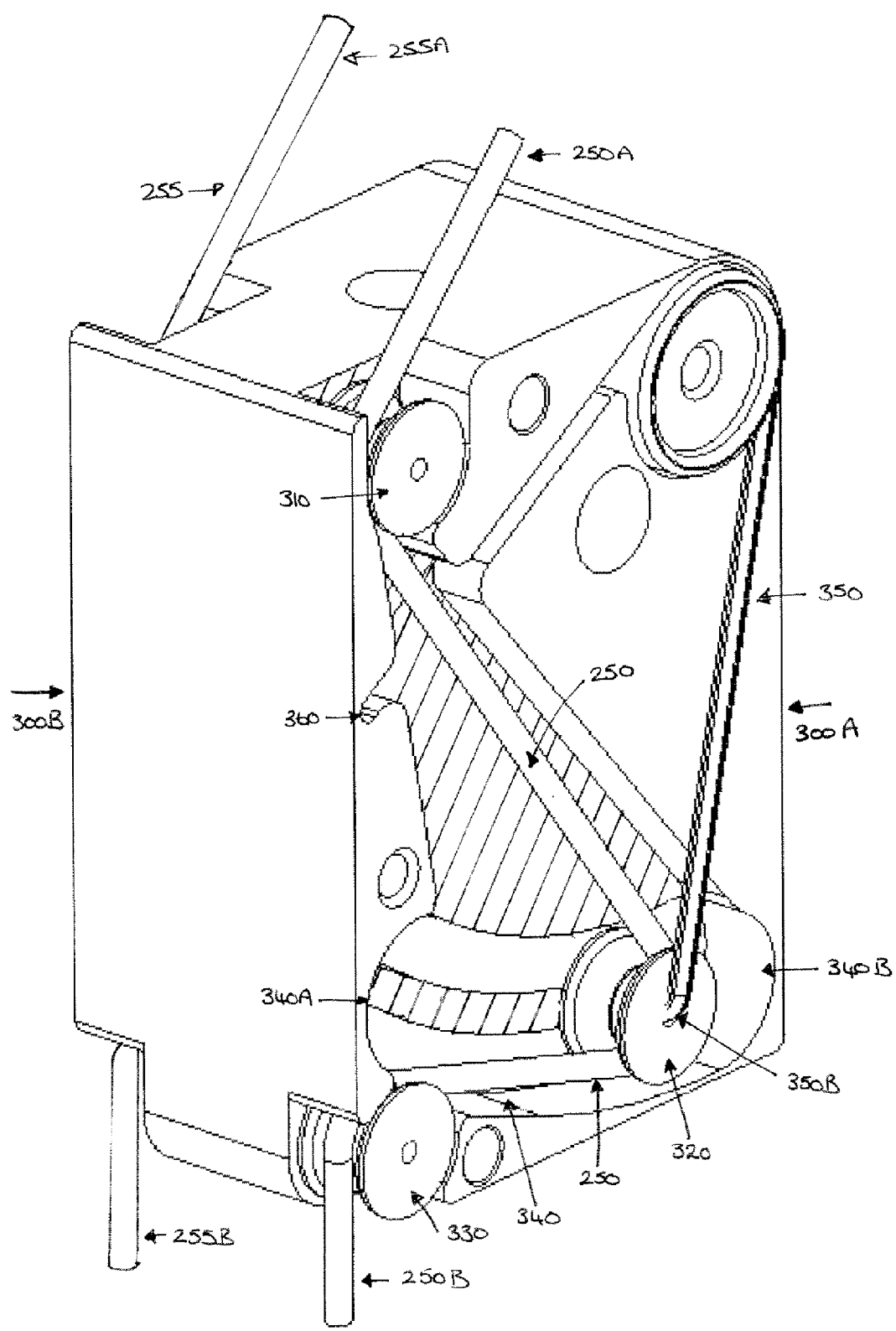
FIG. 8 illustrates schematically a perspective view of a tensioner module.

FIG. 8 illustrates a perspective view of the tensioner module 300. As can be seen from FIG. 8 the two (flex and extend) tendons 250, 255 of each joint are fed into a single tensioner module 300. Tendon 250 is fed into side 300A of the tensioner module 300 illustrated in FIGS. 7, 8 and 9. Tendon 255 is fed into side 300B of the tensioner module 300, which is a mirror image of side 300A.

The tensioner module 300 is advantageous since it maintains tension in the tendons 250, 255, which result in more accurate control of the joint to which the tendons 250, 255 are attached.

Figure 10:
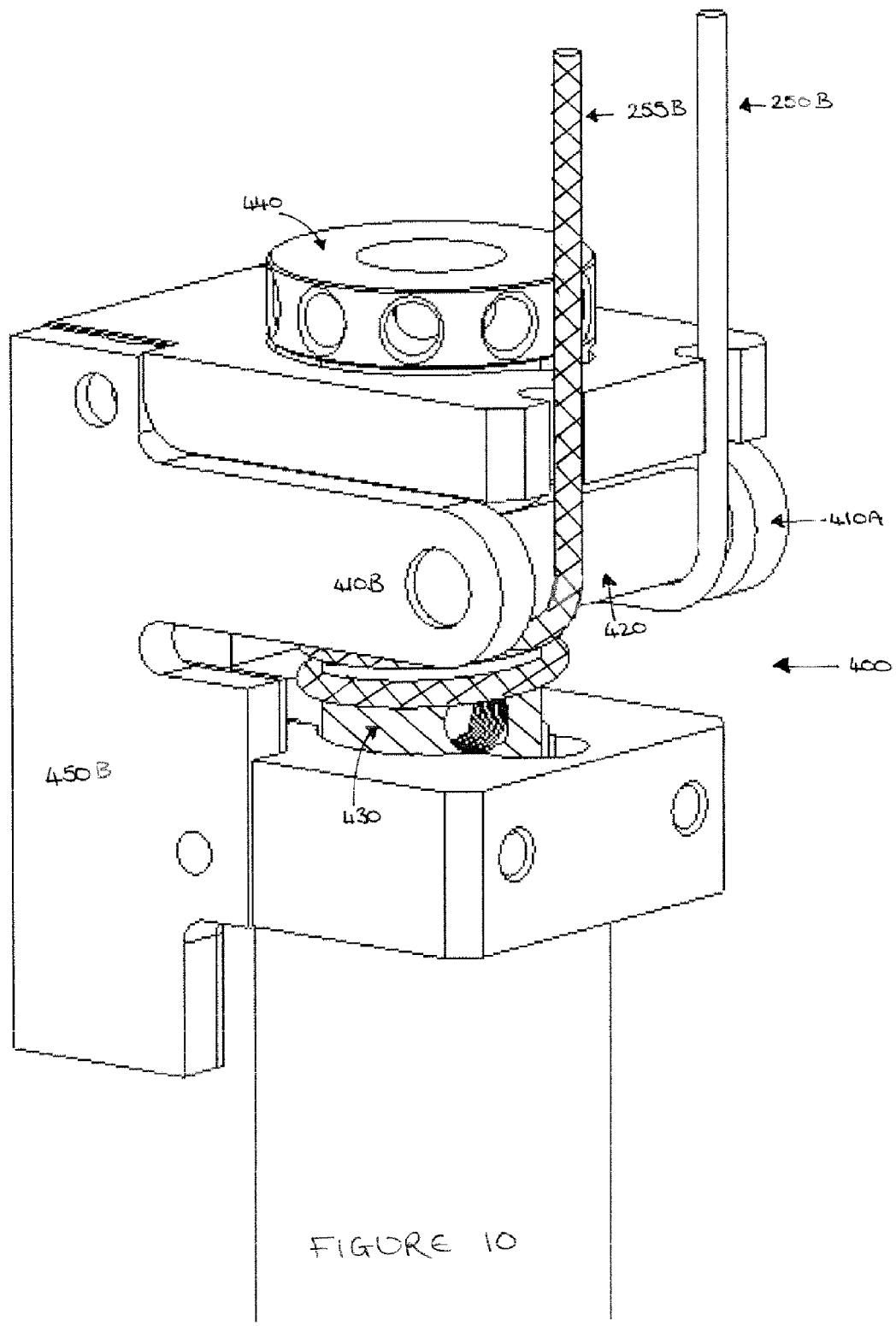
FIG. 10 illustrates schematically a perspective view of a sensing module.

FIG. 10 illustrates a perspective view of the sensor module 400. A second end 250B of tendon 250 and a second end 255B of tendon 255 are provided from the tensioner module 300. The sensor module 400 comprises a spool comprising a first (top half) spool 440 and a second (bottom half) spool 430, a first side piece 450A (not illustrated), a second side piece 450B, a first force sensor 410A, a second force sensor 410B, and a connection bar 420 connecting the first and second force sensors 410A, 410B. The first force sensor 410A and second force sensor 410B may be any force sensor or strain gauge as known in the art.

Figure 13:
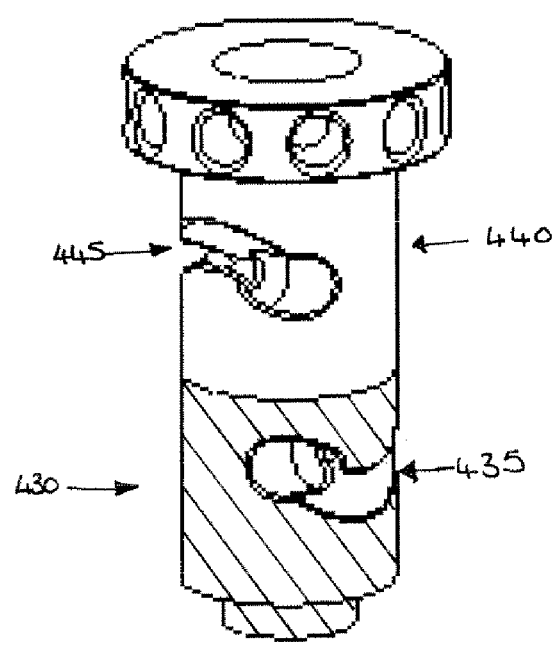
FIG. 13 illustrates schematically a perspective view of a spool.
Figure 14:
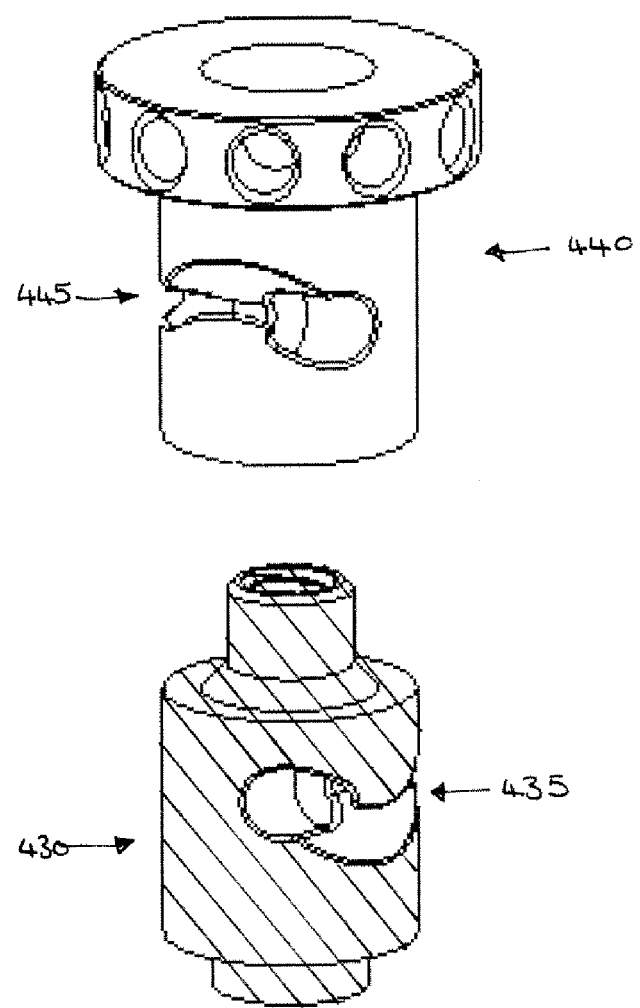
FIG. 14 illustrates schematically another perspective view of a spool.

The tendon 250 is connected to the first spool 440, and the tendon 255 is connected to the second spool 430. FIGS. 13 and 14 illustrate the first and second spools 430, 440 in more detail. FIG. 14 is an exploded view. As can be seen from FIGS. 13 and 14, the first spool 440 comprises a first groove 445, and the second spool 430 comprises a second groove 435. An end of the tendon 250 is trapped within the first groove 445 in order to securely fasten the tendon 250 to the first spool 440. In one embodiment, a knot is tied in the end of the tendon 250 and glue is provided in the first groove 445, such that the knotted end of the tendon 250 is securely fastened to the first groove 445 of the first spool 440. The tendon 250 is then wrapped several times around the first spool 440 and routed over the connection bar 420 next to the first force sensor 410A as illustrated in FIG. 10. An end of the tendon 255 is trapped within the second groove 435 in order to securely fasten the tendon 255 to the second spool 430. In one embodiment, a knot is tied in the end of the tendon 255 and glue is provided in the second groove 435, such that the knotted end of the tendon 255 is securely fastened to the second groove 435 of the second spool 430. The tendon 255 is then wrapped several times around the second spool 430 and routed over the connection bar 420 next to the second force sensor 410B as illustrated in FIG. 10.

Although first and second grooves 445, 435 have been described, any means for securely attaching the tendons 250, 255 to the first and second spools 440, 430 can be utilised.

The first and second spools 440, 430 are provided as two separate devices so that they can be rotated with respect to each other, in order to adjust the tension in the tendons 250, 255. When the tension in the tendons 250, 255 has been adjusted as required, the first and second spools 440, 430 can be fixed in position. In one embodiment, a screw (not illustrated) may be provided through the first and second spools 440, 430 in order to fixed the relative positions of the first and second spools 440, 430. The screw acts to lock the first and second spools 440, 430 so that they do not rotate with respect to each other. When the screw is loosened, the first and second spools 440, 430 can be rotated with respect to each other effectively tightening and loosening the tension in the tendons 250, 255.

Figure 11:
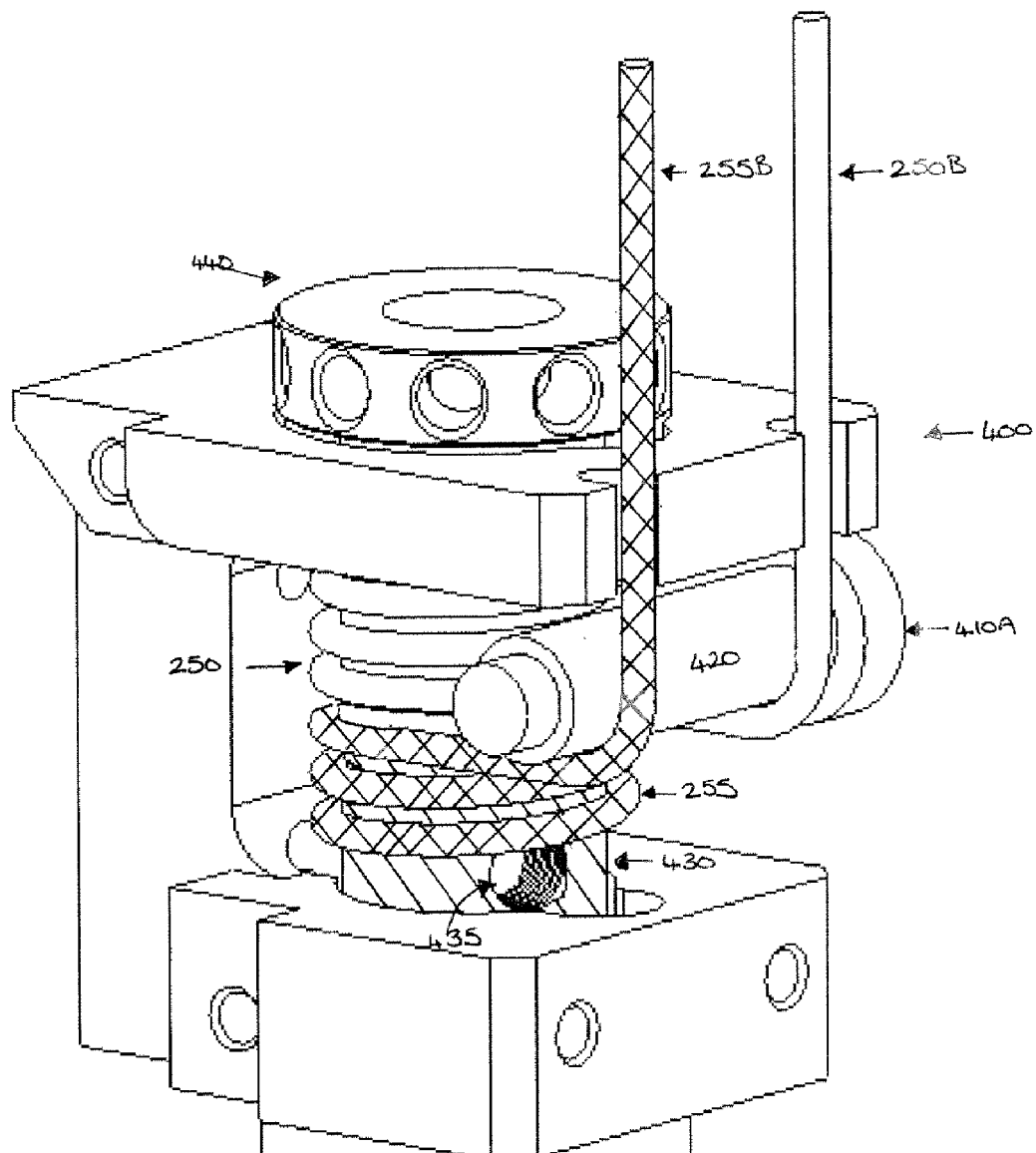
FIG. 11 illustrates schematically another perspective view of a sensing module.
Figure 12:
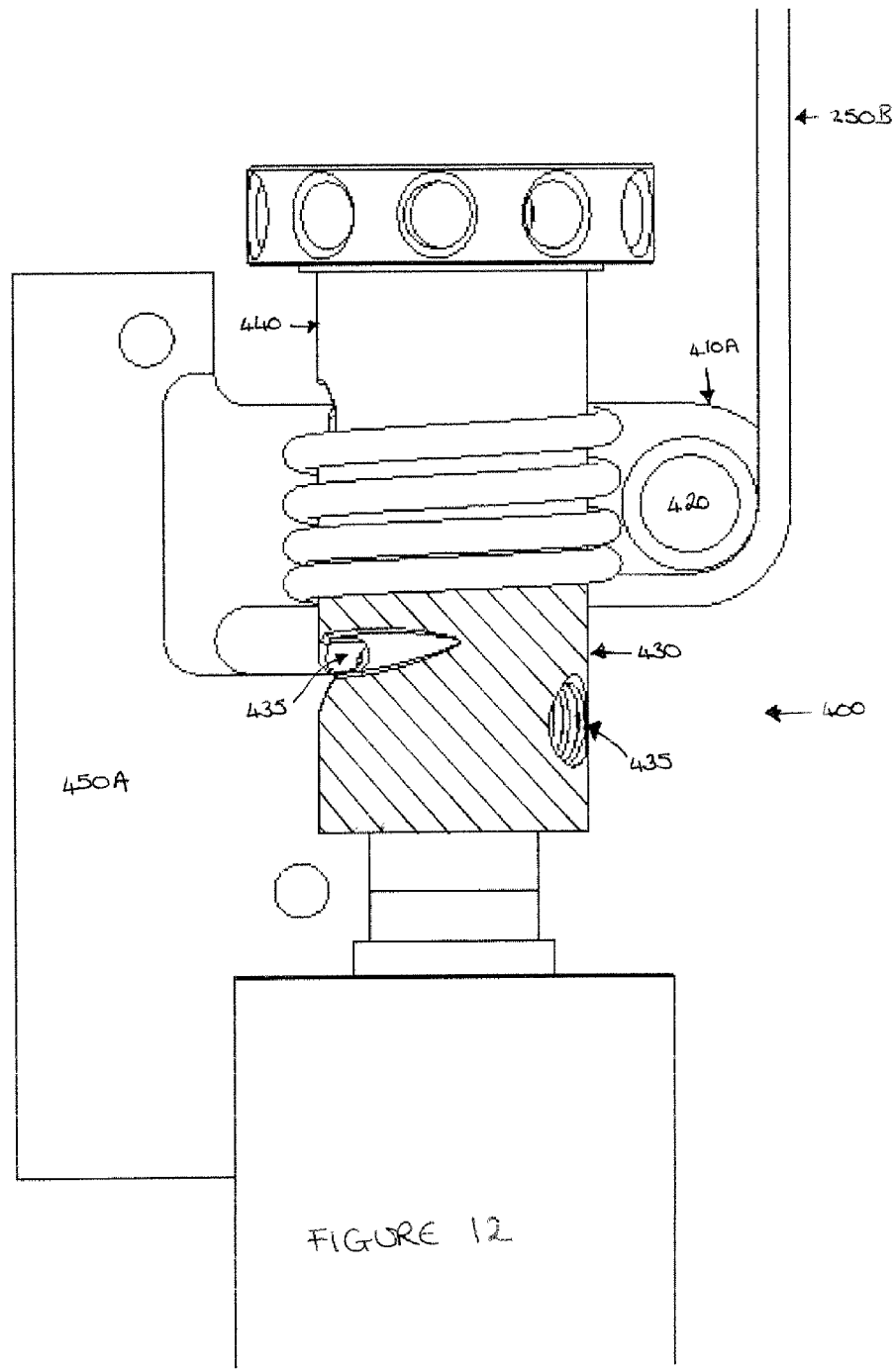
FIG. 12 illustrates schematically a side view cut-through of a sensing module.

FIGS. 11 and 12 illustrates the sensor module 400 without second side piece 450B and second force sensor 410B in order to more clearly illustrate the components of the sensor module 400.

FIG. 11 is a perspective view of the sensor module 400. As can be seen in FIG. 11, the tendons 250, 255 are routed over the connection bar 420, the tendon 250 is routed next to the first force sensor 410A and the tendon 255 is routed next to the second force sensor 410B (illustrated in FIG. 10). Consequently, the first force sensor 410A is capable of detecting force applied to the tendon 250, whilst the second force sensor 410B is capable of detecting force applied to the tendon 255. The arrangement of the first and second force sensors 410A, 410B and the connection bar 420 of the sensing module 400 is advantageous since is enables the first and second force sensors 410A, 410B to detect force from the tendons 250, 255 respectively, without restricting movement of the tendons 250, 255.

FIG. 12 is a side view of the sensor module 400 and only illustrates tendon 250B.

As illustrated in FIGS. 5 and 6 the sensor module 400 is connected to the actuation module 500. In one embodiment, the shaft of the motor is connected to the first and second spools 440, 430.

Figure 16A:
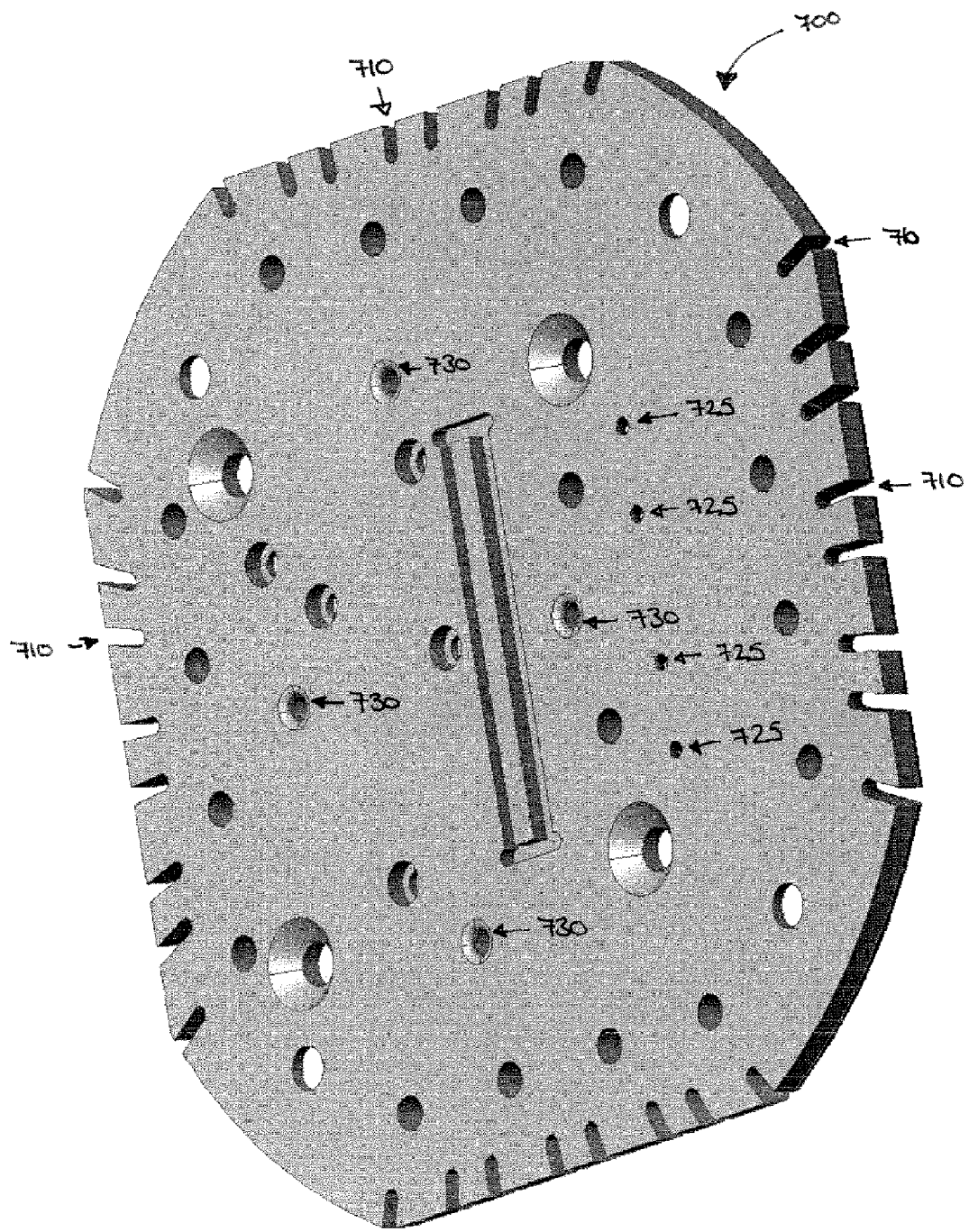
FIG. 16A illustrates a perspective view of an underside of a routing plate.
Figure 16B:
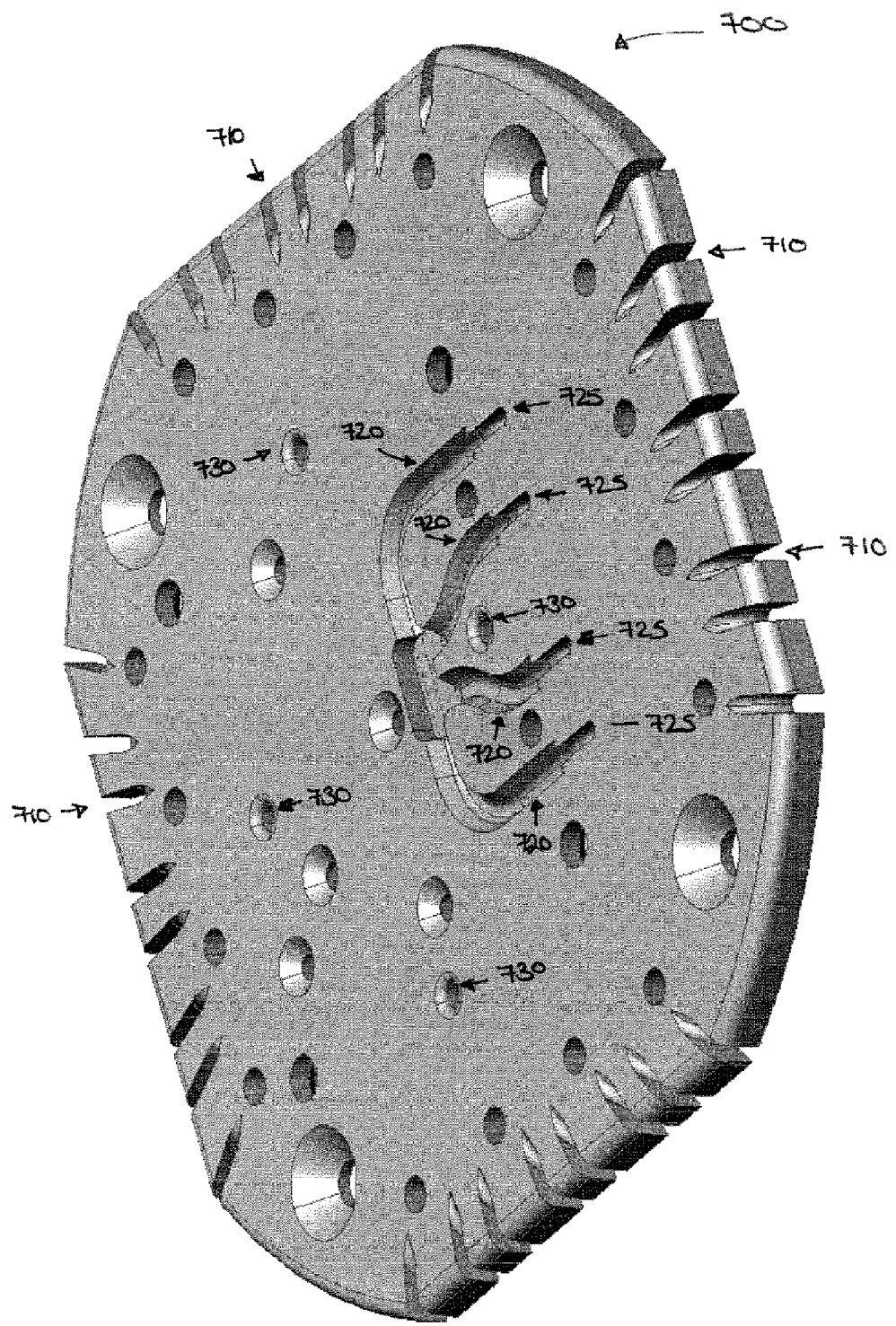
FIG. 16B illustrates a perspective view of a routing plate.

Referring again to FIGS. 1A, 1B and 1C, the control section 20 comprises a routing plate 700. The routing plate 700 is also illustrated in FIGS. 16A and 16B. The routing plate 700 provides standardised routing of the tendons from the hand section 10 to the control section 20. In particular, the routing plate 700 provides routing for each pair of tendons associated with each joint of the hand section 10, to the associated actuation device which will control movement of that joint.

The routing plate 700 is approximately square in shape, having four sides. Each side having eight grooves 710, one groove 710 for each tendon. Each pair of tendons connecting to an actuation device, in the control section 20. Each side of the control section 20 provided with four actuation devices. In addition, the routing plate 700 has four grooves 720 (illustrated in FIG. 16B) connected to four guide holes 725 at it's centre and four routing holes 730 for routing a further eight tendons. Each pair of tendons connecting to an actuation device, in the control section 20. The centre of the control section 20 the control section 20 provided with four actuation devices. Consequently, the robotic hand of FIGS. 1A and 1B comprises 20 independent joints, each connected to one of twenty actuation devices.

The routing plate 700 is not limited to being approximately square in shape, and different shaped routing plates 700 may be utilised, such as, for example, approximately rectangular in shape, approximately hexagonal in shape, approximately circular in shape etc.

As can be seen in FIGS. 1A and 1B each pair of tendons is routed through the wrist section 140, 142, 144 and then fed to a tensioner module 300 of the actuation devices. As discussed with reference to FIG. 2 the wrist section has two wrist joints 140, 142. The first wrist joint 140 enables the hand section 10 to move about an X axis $X_6$, and the second wrist joint 142 enables the hand section 10 to move about a Y axis $Y_4$. The fourth Y axis $Y_4$ is orthogonal to the sixth X axis $X_6$. The first and second wrist joints 140, 142 can also be seen in FIG. 1A.

Figure 15:
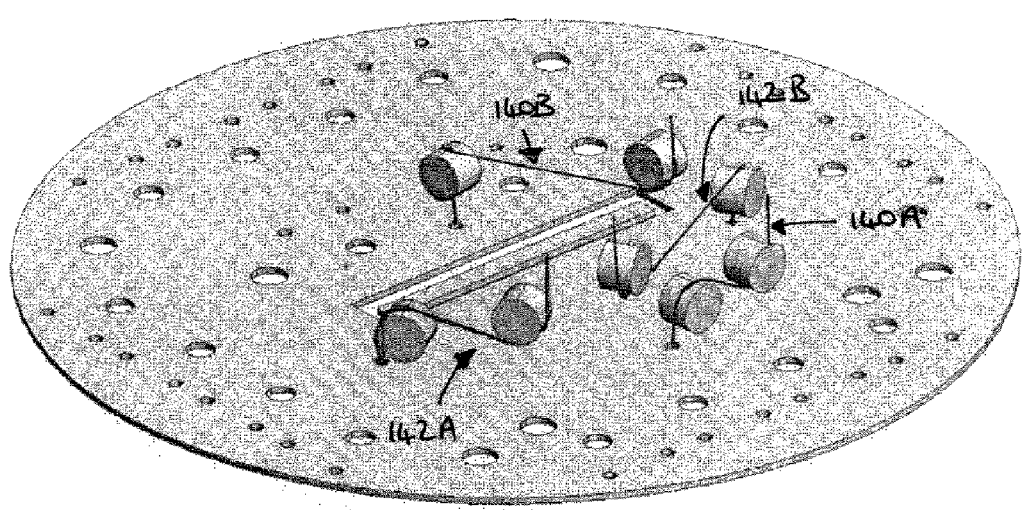
FIG. 15 illustrates schematically an arrangement of tendons for controlling movement of a robotic wrist section.

FIG. 15 illustrates schematically a pulley arrangement for routing the tendons of the first and second wrist joints 140, 142 to the actuation devices provided at the centre of the control section. Referring to FIG. 15, tendon 140A is the flex tendon of the first wrist joint 140 and tendon 140B is the extend tendon of the first wrist joint 140. The tendon 142A is the flex tendon of the second wrist joint 142 and tendon 142B is the extend tendon of the second wrist joint 142.

When the tendons are provided about a circular joint such as the first wrist joint 140 it is possible for the flex and extend tendons 140A, 140B to be moved substantially the same distance in order to flex and extend the hand section 10 about the first wrist joint 140. However, it is difficult to make the second wrist joint 142 also a circular joint. Consequently, components 144 (illustrated in FIG. 1A), which have a curved outer surface, are provided in order to guide the tendons 142A, 142B of the second wrist joint 142. Although components 144 do not form a perfect circle, the curved surfaces 144 are such that the flex and extend tendons 142A, 142B can be moved substantially the same distance in order to flex and extend the hand section 10 about the second wrist joint 142.

The wrist joint arrangement is advantageous since it reduces backlash.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognise that the invention has a broad range of applications in many different types of robotics, and that the embodiments may take a wide range of modifications without departing from the inventive concept as defined in the appended claims.

What is claimed is:

1. A robotic hand assembly comprising:
   a hand section comprising:
      at least one digit provided with at least one actuatable joint; and
   a control section comprising:
      at least one actuation device, the at least one actuation device comprising:
         a sensing module configured to sense a force applied to a tendon coupled at a first end to the at least one actuatable, wherein the tendon comprise a first tendon and a second tendon, and
      wherein the sensing module comprises:
         a first force sensor;
         a second force sensor; and
         a connection bar coupled between the first and second force sensors; and
      an actuation module configured to actuate the at least one actuatable joint.

2. The robotic hand assembly of claim 1, wherein the first force sensor is configured to sense a force applied to the first tendon and the second force sensor is configured to sense a force applied to the second tendon.

3. The robotic hand assembly of claim 1, wherein the first tendon is routed over the connection bar adjacent to the first force sensor, and the second tendon is routed over the connection bar adjacent to the second force sensor.

4. The robotic hand assembly of claim 1, wherein the sensing module further comprises:
   a spool, wherein a second end of the tendon is coupled to the spool.

5. The robotic hand assembly of claim 4, wherein the spool comprises a first spool and a second spool, and wherein the second end of the first tendon is coupled to the first spool and the second end of the second tendon is coupled to the second spool.

6. The robotic hand assembly of claim 5, wherein the first spool and the second spool are configured to be moveable relative to one another, in order to adjust a tension in the first and second tendons.

7. The robotic hand assembly of claim 6, wherein the sensing module further comprises:
   a securing device configured to secure the first and second spools relative to one another.

8. The robotic hand assembly of claim 1, wherein the at least one actuation device further comprises:
   a tensioner module configured to apply tension to the tendon.

9. The robotic hand assembly of claim 8, wherein the tensioner module comprises:
   biasing means configured to bias the tendon in a first direction to apply tension to the tendon.

10. The robotic hand assembly of claim 9, wherein the biasing means comprises:
    a pulley provided in a recess, wherein the tendon is routed around the pulley; and
    a biasing device coupled to the pulley biasing the pulley towards a first end of the recess to apply tension the tendon.

11. The robotic hand assembly of claim 10, wherein the biasing device comprises a spring.

12. The robotic hand assembly of claim 1, wherein the actuation module comprises a motor and gears.

13. The robotic hand assembly of claim 12, wherein the actuation module further comprises control means for controlling the motor and gears.

14. The robotic hand assembly of claim 13, wherein the control means comprises a printed circuit board.

15. The robotic hand assembly of claim 1, wherein the control section comprises:
   a cooling device configured to cool the at least one actuation module.

16. The robotic hand assembly of claim 1, further comprising:
   a routing plate configured to enable routing of the tendons to the associated actuation device.

17. The robotic hand assembly of claim 16, wherein the routing plate comprises: a square routing plate; or a rectangular routing plate; or a hexagonal routing plate, or a circular routing plate.

18. The robotic hand assembly of claim 16, wherein the routing plate comprises a plurality of grooves, each groove for routing a tendon.

* * * * *

UNITED STATES PATENT AND TRADEMARK OFFICE
CERTIFICATE OF CORRECTION

| | | |
|---|---|---|
| PATENT NO. | : 8,483,880 B2 | Page 1 of 1 |
| APPLICATION NO. | : 12/841990 | |
| DATED | : July 9, 2013 | |
| INVENTOR(S) | : Armando de la Rosa Tames et al. | |

It is certified that error appears in the above-identified patent and that said Letters Patent is hereby corrected as shown below:

IN THE CLAIMS:

In Column 14, Line 19

Replace "actuatable, wherein", with --actuatable joint, wherein--.

Signed and Sealed this
Thirtieth Day of December, 2014

Michelle K. Lee
*Deputy Director of the United States Patent and Trademark Office*